(12) United States Patent
Ueda et al.

(10) Patent No.: US 9,077,010 B2
(45) Date of Patent: Jul. 7, 2015

(54) SEALING MATERIAL FOR THIN PLATE MEMBER

(75) Inventors: Akira Ueda, Gojo (JP); Kenichi Takahashi, Gojo (JP); Atsushi Fujii, Osaka (JP); Tetsuya Kawamura, Osaka (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 13/982,875

(22) PCT Filed: Mar. 30, 2012

(86) PCT No.: PCT/JP2012/058522
§ 371 (c)(1),
(2), (4) Date: Jul. 31, 2013

(87) PCT Pub. No.: WO2012/133738
PCT Pub. Date: Oct. 4, 2012

(65) Prior Publication Data
US 2013/0307227 A1  Nov. 21, 2013

(30) Foreign Application Priority Data

Mar. 31, 2011 (JP) ................................. 2011-078007
Mar. 14, 2012 (JP) ................................. 2012-057048

(51) Int. Cl.
*F16L 17/00* (2006.01)
*H01M 2/08* (2006.01)
*F16J 15/06* (2006.01)
*F16J 15/10* (2006.01)
(Continued)

(52) U.S. Cl.
CPC ................ *H01M 2/08* (2013.01); *F16J 15/062* (2013.01); *F16J 15/106* (2013.01); *H01M 8/18* (2013.01); *H01M 8/0276* (2013.01); *Y02E 60/528* (2013.01); *H01M 8/188* (2013.01); *H01M 8/0297* (2013.01); *Y02E 60/126* (2013.01)

(58) Field of Classification Search
CPC ............................... F16J 15/062; F16J 15/106
USPC ................... 277/644, 647, 648, 649
See application file for complete search history.

(56) References Cited

U.S. PATENT DOCUMENTS 4,072,245 A * 2/1978 Sloan, Jr. ....................... 220/295
4,102,472 A * 7/1978 Sloan, Jr. ....................... 220/295
(Continued)

FOREIGN PATENT DOCUMENTS

CN 1476646 A 2/2004
CN 1574416 A 2/2005
(Continued)

*Primary Examiner* — Gilbert Lee
(74) *Attorney, Agent, or Firm* — The Webb Law Firm

(57) ABSTRACT

There is provided a sealing material for a thin plate member which eliminates the need to form seal grooves as in prior art when applied to a thin plate member such as a cell of a secondary battery such as a redox flow battery, a fuel cell and a lead storage battery, and which provides satisfactory sealing and can compactify and reduce in weight a device to be used and facilitate assembling with reduced cost as well as allowing more cells to be stacked resulting in improving fuel capacity. The annular sealing material for a thin plate member that provides sealing between thin plate members includes a lateral sealing body disposed on a lateral of the thin plate member, and a pair of sealing legs branching from the lateral sealing body in a fork shape and disposed on the front surface and the back surface of the thin plate member.

9 Claims, 21 Drawing Sheets

(51) Int. Cl.
*H01M 8/18* (2006.01)
*H01M 8/02* (2006.01)

(56) References Cited

U.S. PATENT DOCUMENTS

| | | | | |
|---|---|---|---|---|
| 4,199,158 | A | * | 4/1980 | de Munck ................ 277/648 |
| 4,784,397 | A | * | 11/1988 | Tozer ...................... 277/644 |
| 5,007,202 | A | * | 4/1991 | Guillon .................... 49/441 |
| 5,116,696 | A | | 5/1992 | Barp |
| 5,238,136 | A | * | 8/1993 | Kasugai et al. .......... 220/304 |
| 6,161,841 | A | * | 12/2000 | Shaw ...................... 277/642 |
| 7,073,796 | B2 | * | 7/2006 | Tanioka et al. ........... 277/626 |
| 7,121,558 | B2 | | 10/2006 | Cho |
| 7,226,685 | B2 | | 6/2007 | Kuroki et al. |
| 7,670,719 | B2 | | 3/2010 | Nakaishi et al. |
| 7,828,302 | B2 | * | 11/2010 | Hurlbert et al. .......... 277/637 |
| 7,938,406 | B2 | * | 5/2011 | Matsumoto et al. ...... 277/637 |
| 2004/0170893 | A1 | | 9/2004 | Nakaishi et al. |
| 2005/0242571 | A1 | * | 11/2005 | Houghton et al. ........ 285/110 |
| 2007/0190390 | A1 | | 8/2007 | Kuroki et al. |
| 2008/0016800 | A1 | * | 1/2008 | Tufts et al. ............... 52/204.6 |
| 2010/0140881 | A1 | * | 6/2010 | Matsuo .................... 277/648 |
| 2012/0107718 | A1 | | 5/2012 | Masaka et al. |

FOREIGN PATENT DOCUMENTS

| | | | |
|---|---|---|---|
| GB | 2189851 A | * | 11/1987 |
| JP | 6191664 U | | 6/1986 |
| JP | 03107674 A | | 5/1991 |
| JP | 0750169 A | | 2/1995 |
| JP | 2003056704 A | | 2/2003 |
| JP | 2004245341 A | | 9/2004 |
| JP | 3682244 B2 | | 5/2005 |
| JP | 2011003453 A | | 1/2011 |

* cited by examiner

Prior Art

SEALING MATERIAL FOR THIN PLATE MEMBER

CROSS-REFERENCE TO RELATED APPLICATIONS

This application is the United States national phase under 35 U.S.C. §371 of International Application No. PCT/JP2012/058522 filed Mar. 30, 2012, entitled "Sealing Material for Thin Plate Member", and claims priority under 35 U.S.C. §119(a)-(d) to Japanese Patent Application Nos. 2011-078007, filed on Mar. 31, 2011 and 2012-057048, filed on Mar. 14, 2012 in the Japanese Intellectual Property Office, the disclosures of which are hereby incorporated by reference in their entirety.

TECHNICAL FIELD

The present invention relates to a sealing material for a thin plate member that provides sealing between thin plate members such as cells of secondary batteries such as redox flow batteries, fuel cells and lead storage batteries and between thin plate members such as filters.

BACKGROUND ART

A conventional structure of a secondary battery such as a fuel cell is for example as illustrated in FIG. 19.

FIG. 19 is a partially-enlarged perspective view schematically showing a structure of a fuel cell of prior art.

As shown in FIG. 19, a fuel cell 100 is composed of a positive electrode (air electrode) 102 and a negative electrode (fuel electrode) 104, and between the positive electrode 102 and the negative electrode 104, an electrolyte 106 through which ions can permeate is disposed.

The positive electrode 102 is composed of a carbon electrode 102a and a platinum catalyst 102b, as shown in FIG. 20(A) which is an enlarged view of "A" of FIG. 19. Similarly, the negative electrode 104 is composed of a carbon electrode 104a and a platinum catalyst 104b, as shown in FIG. 20(B) which is an enlarged view of "B" of FIG. 19.

The positive electrode 102 and the negative electrode 104 each have a structure through which gas permeates, and thus is configured to allow oxygen and hydrogen necessary for reaction to permeate therethrough.

Outside of the positive electrode 102, a separator for a positive electrode 108 is disposed, and on the positive electrode 102 side of the separator for the positive electrode 108, an air feeding groove 108a for feeding air to the positive electrode 102 is formed.

On the other hand, outside of the negative electrode 104, a separator for a negative electrode 110 is disposed, and on the negative electrode 104 side of the separator for a negative electrode 110, an oxygen feeding groove 110a for feeding oxygen to the negative electrode 104 is formed.

The separator for a positive electrode 108, the positive electrode 102, an electrolyte 106, the negative electrode 104 and the separator for a negative electrode 110 constitute a cell 112.

As shown in FIG. 21, a fuel cell 100 is formed by stacking a large number of cells 112 so as to have a stack structure.

Meanwhile, there is a need for a sealing material to seal between the cells 112 in order to prevent the outward leakage of the electrolytic solution contained in the electrolyte 106, of air flowing through the air feeding groove 108a of the separator for a positive electrode 108, and of oxygen flowing through the oxygen feeding groove 110a of the separator for a negative electrode 110.

As such a sealing structure, it has been proposed to dispose a sealing structure between a cell frame and a cell, as in Patent Literature 1 (JP-B-3682244).

In Patent Literature 1, on both surfaces of each of the upper and lower cell frames, inner seal grooves and outer seal grooves totaling four seal groves are formed, and to these seal grooves, a total of four sealing materials formed from an O-ring are attached. That is, to a total of eight seal grooves formed on the upper and lower cell frames, a total of eight sealing materials are attached.

CITATION LIST

Patent Literature

[Patent Literature 1] JP-B-3682244

However, such a conventional sealing structure involves the need for each cell frame to have the inner seal grooves and the outer seal grooves totaling four seal grooves formed thereon. This complicates the structure and involves extra production steps and more cost.

Moreover, the need to prepare a total of four sealing materials, which increases the number of members, and to form a frame-held cell by assembling through holding the cell with a cell frame while attaching the sealing materials to the seal grooves represents cumbersome work.

Furthermore, the need to form the inner seal grooves and the outer seal grooves totaling four seal grooves on both surfaces of the cell frame thickens the cell frame, increasing the size and weight of a fuel cell.

The thickened cell frame reduces the number of the frame-held cells to be stacked, with a result that a cell capacity is reduced.

In view of the above, it is an object of the present invention to provide a sealing material for a thin plate member which is thinner and provides satisfactory sealing between thin plate members with fewer sealing materials and which can compactify and reduce in weight a device to be used and facilitate assembling with reduced cost.

It is another object of the present invention to provide a sealing material for a thin plate member which eliminates the need to form seal grooves as in prior art when applied to a thin plate member such as a cell of a secondary battery such as a redox flow battery, a fuel cell and a lead storage battery, and which provides satisfactory sealing and can compactify and reduce in weight a device to be used and facilitate assembling with reduced cost as well as allowing more cells to be stacked resulting in improving fuel capacity.

SUMMARY OF THE INVENTION

The present invention has been made to overcome the problem in prior art and attain the object as described above.

The sealing material for a thin plate member of the present invention is an annular sealing material for a thin plate member that provides sealing between thin plate members, the sealing material comprising:

a lateral sealing body disposed on a lateral of the thin plate member, and a pair of sealing legs branching from the lateral sealing body in a fork shape and disposed on the front surface and the back surface of the thin plate member.

By the pair of sealing legs branching in a fork shape and disposed on the front surface and the back surface of the thin plate member, sealing can be provided between the front/back surfaces of the thin plate member and a counterpart member, for example, between thin plate members when thin plate members are stacked.

On the other hand, by the lateral sealing body disposed on the lateral of the thin plate member, sealing can be provided between the lateral sealing body and a counterpart member, thereby sealing the lateral of the thin plate member.

Thus, a single sealing material for a thin plate member can ensure double sealing: sealing by a pair of sealing legs and sealing by the lateral sealing body.

This embodiment makes it possible to provide a sealing material for a thin plate member with superior sealing property which is thinner and provides satisfactory sealing between thin plate members with fewer sealing materials and which can compactify and reduce in weight a device to be used and facilitate assembling with reduced cost.

When the sealing material for a thin plate member is applied to, for example, thin plate members such as cells of secondary batteries including redox flow batteries, fuel cells and lead storage batteries, a pair of sealing legs can prevent an electrolytic solution of the cells from leaking between the upper and lower cells, and the lateral sealing body can prevent an electrolytic solution of the cells from leaking outward from the lateral.

Moreover, it is possible to provide a sealing material for a thin plate member which eliminates the need to form seal grooves as in prior art and which provides satisfactory sealing and can compactify and reduce in weight a device to be used and facilitate assembling with reduced cost as well as allowing more cells to be stacked resulting in improving fuel capacity.

By the lateral sealing body disposed on the lateral of the thin plate member, and the pair of sealing legs branching in a fork shape and disposed on the front and back surfaces of the thin plate member, the sealing material for a thin plate member can be easily attached to the lateral of the thin plate member. The thin plate member having the sealing material for a thin plate member attached thereto can be handled as a member, which leads to excellent handling property, e.g., at the time of assembling.

In a sealing material for a thin plate member of the present invention, the lateral sealing body has a body-side press-contact sealing projection projecting outward in the thickness direction on at least one side of the front surface side and the back surface side.

The body-side press-contact sealing projection of the lateral sealing body more ensures the sealing of the lateral of the thin plate member.

In a sealing material for a thin plate member of the present invention, the body-side press-contact sealing projection is formed from a plurality of body-side press-contact sealing projections each spaced with a predetermined interval in the diameter direction.

The plurality of body-side press-contact sealing projections each spaced with a predetermined interval in the diameter direction more ensures the sealing of the lateral of the thin plate member.

In a sealing material for a thin plate member of the present invention, the body-side press-contact sealing projections are positioned in a corresponding manner between the front surface and the back surface.

The body-side press-contact sealing projections positioned in a corresponding manner between the front surface and the back surface more ensures the sealing of the lateral of the thin plate member.

In a sealing material for a thin plate member of the present invention, at least one of the sealing legs has a leg-side press-contact sealing portion having a larger thickness.

The formation of a leg-side press-contact sealing portion having a larger thickness than the thickness of the sealing leg more ensures the sealing between the front/back surfaces of the thin plate member and a counterpart member, for example, between thin plate members when thin plate members are stacked.

In a sealing material for a thin plate member of the present invention, the leg-side press-contact sealing portion is formed from a plurality of leg-side press-contact sealing portions each spaced with a predetermined interval in the branching direction.

The plurality of leg-side press-contact sealing portions each spaced with a predetermined interval in the branching direction more ensures sealing between the front/back surfaces of the thin plate member and a counterpart member, for example, between thin plate members when thin plate members are stacked.

In a sealing material for a thin plate member of the present invention, the leg-side press-contact sealing portions are positioned in a corresponding manner between a pair of sealing legs.

The formation of the leg-side press-contact sealing portions positioned in a corresponding manner between a pair of sealing legs improves sealing property at the leg-side press-contact sealing portions.

In a sealing material for a thin plate member of the present invention, the sealing leg has a bending portion that bends outward.

The sealing leg having a bending portion that bends outward makes it possible to reduce compression load applied to the thin plate member and prevent the friction with the thin plate member from becoming larger than is needed, when the thin plate member is held. By this configuration, when the thin plate member is thermally swollen or thermally shrunk, the sealing leg can behave so as to follow it.

In a sealing material for a thin plate member of the present invention, the lateral sealing body has a curving portion at a lateral end thereof.

The lateral end of the lateral sealing body having a curving shape (curving portion) makes it possible to decrease sliding resistance when the sealing material holds the thin plate member and is enclosed by the frame.

In a sealing material for a thin plate member of the present invention, the thin plate member is a member used for batteries.

When applied for a member for batteries, the sealing material of the invention can ensure sealing between cells.

According to the present invention, by a pair of sealing legs branching in a fork shape and disposed on the front and back surfaces of the thin plate member, sealing can be provided between the front/back surfaces of the thin plate member and a counterpart member, for example, between thin plate members when thin plate members are stacked.

On the other hand, by the lateral sealing body disposed on the lateral of the thin plate member, sealing can provided between the lateral sealing body and a counterpart member, thereby sealing the lateral of the thin plate member.

Thus, a single sealing material for a thin plate member can ensure double sealing: sealing by a pair of sealing legs and sealing by the lateral sealing body.

This embodiment makes it possible to provide a sealing material for a thin plate member with superior sealing property which is thinner and provides satisfactory sealing between thin plate members with fewer sealing materials and which can compactify and reduce in weight a device to be used and facilitate assembling with reduced cost.

When the sealing material for a thin plate member is applied to, for example, thin plate members such as cells of secondary batteries including redox flow batteries, fuel cells and lead storage batteries, a pair of sealing legs can prevent an electrolytic solution of the cells from leaking between the upper and lower cells, and the lateral sealing body can prevent an electrolytic solution of the cells from leaking outward from the lateral.

Moreover, it is possible to provide a sealing material for a thin plate member which eliminates the need to form seal grooves as in prior art and which provides satisfactory sealing and can compactify and reduce in weight a device to be used and facilitate assembling with reduced cost as well as allowing more cells to be stacked resulting in improving fuel capacity.

By the lateral sealing body disposed on the lateral of the thin plate member, and the pair of sealing legs branching in a fork shape and disposed on the front and back surfaces of the thin plate member, the sealing material for a thin plate member can be easily attached to the lateral of the thin plate member. The thin plate member having the sealing material for a thin plate member attached thereto can be handled as a member, which leads to excellent handling property, e.g., at the time of assembling.

DESCRIPTION OF THE INVENTION

Hereinafter, embodiments of the present invention are described with greater detail with reference to drawings.

Figure 1:
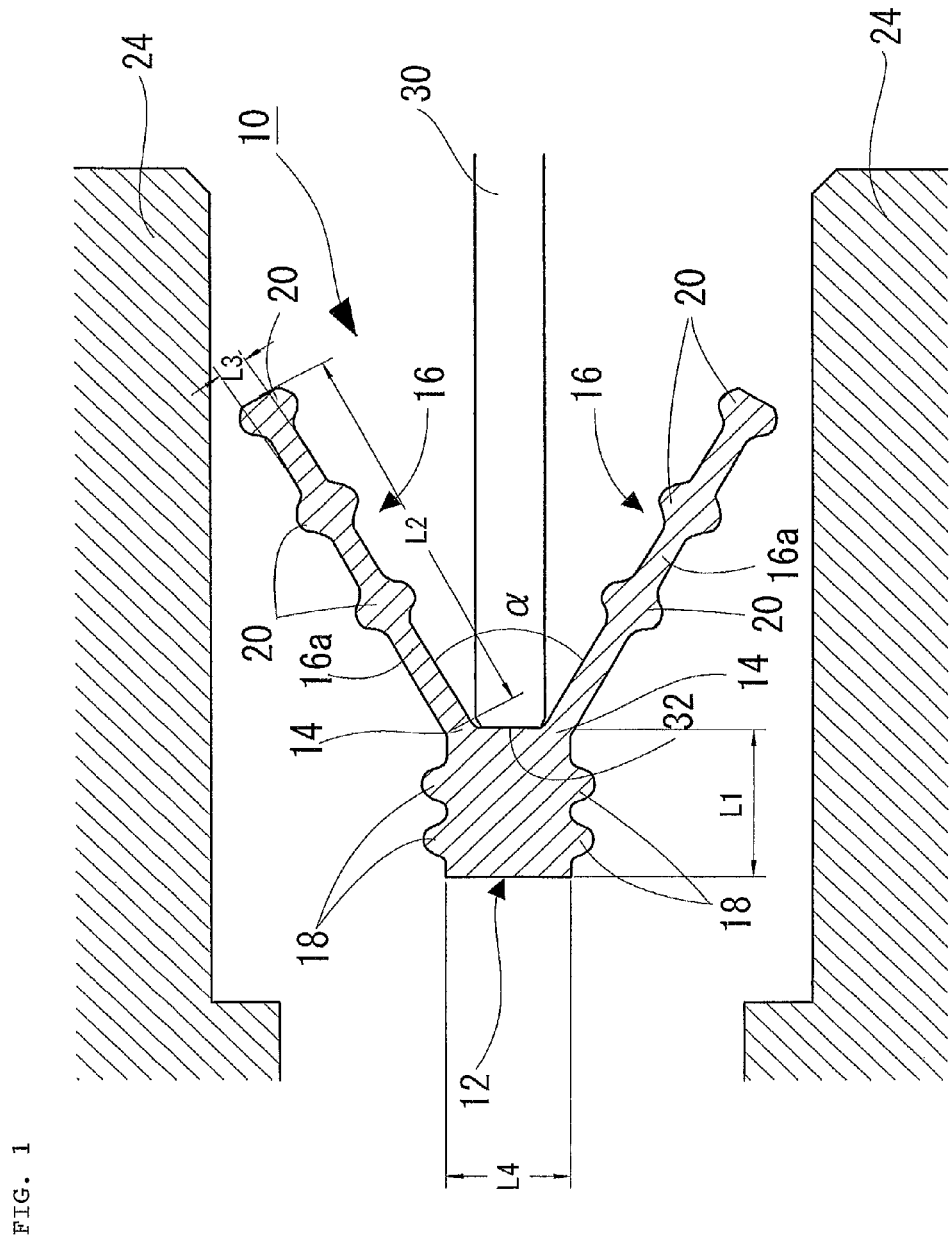
FIG. 1 is a partially-enlarged cross-sectional view showing an embodiment where a sealing material for a thin plate member of the present invention is applied to a cell of a secondary battery such as a redox flow battery, the cell being a thin plate member to which a sealing material is attached.
Figure 2:
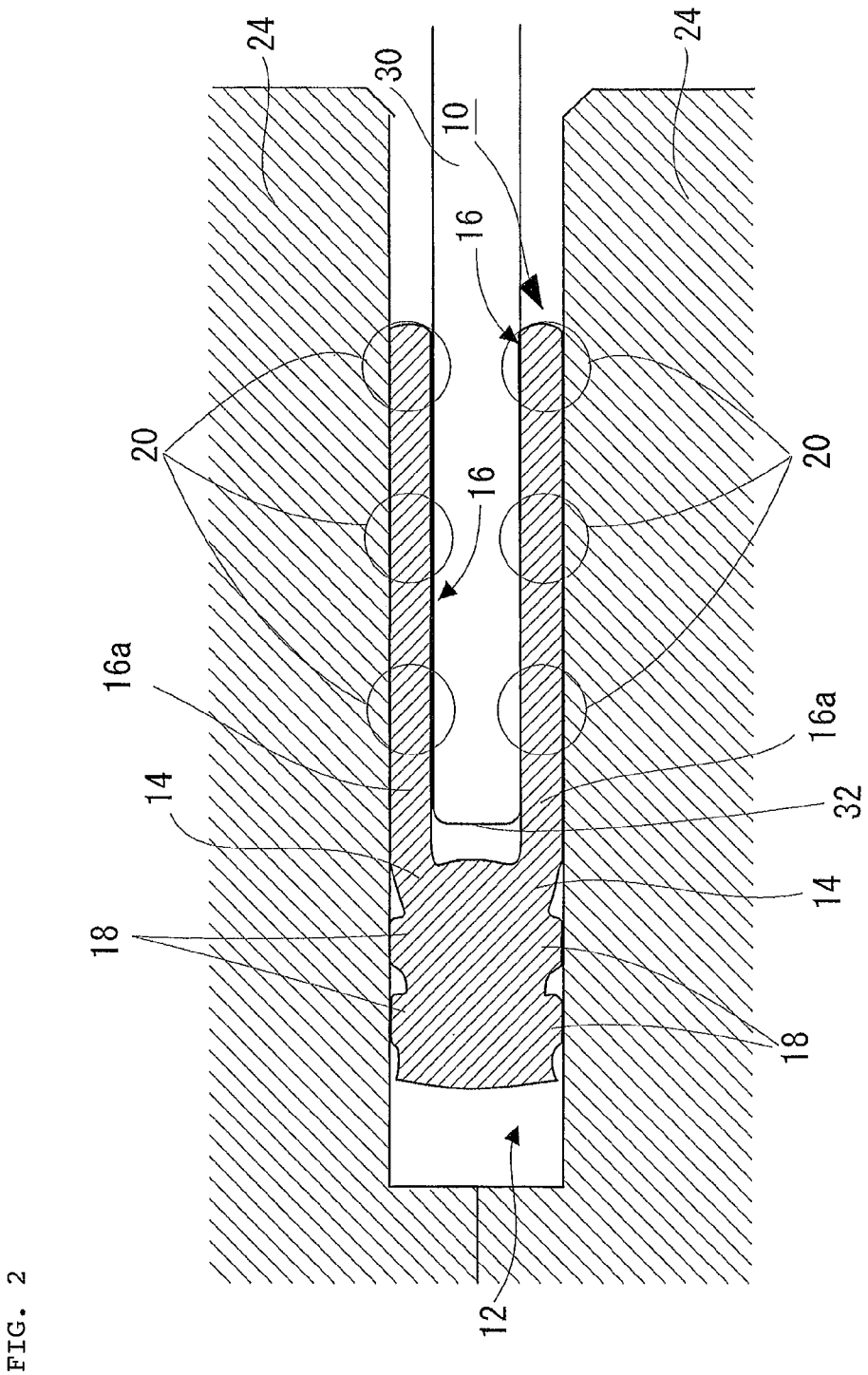
FIG. 2 is a partially-enlarged cross-sectional view showing the compression by the sealing material for a thin plate member of FIG. 1.

FIG. 1 is a partially-enlarged cross-sectional view showing an embodiment where a sealing material for a thin plate member of the present invention is applied to a cell of a secondary battery such as a redox flow battery, the cell being a thin plate member to which a sealing material is attached. FIG. 2 is a partially-enlarged cross-sectional view showing the compression by the sealing material for a thin plate member of FIG. 1.

In FIG. 1 and FIG. 2, the symbol "10" indicates a sealing material for a thin plate member of the present invention.

As shown in FIG. 1, the sealing material for a thin plate member of the present invention 10 is annular, and is attached to a thin plate member to which a sealing material is attached: in this embodiment, is attached to a lateral 32 of a thin plate member 30 formed from a cell (in this embodiment, lateral on the outer circumferential side).

Figure 3:
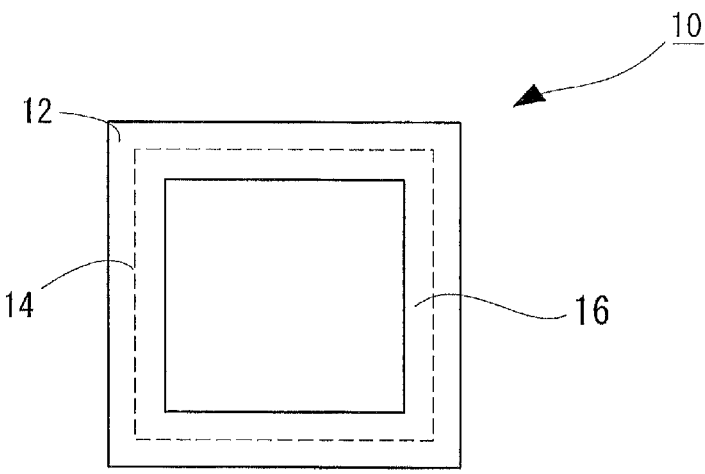
FIG. 3 is a top view of a sealing material for a thin plate member according to the present invention.
Figure 3:
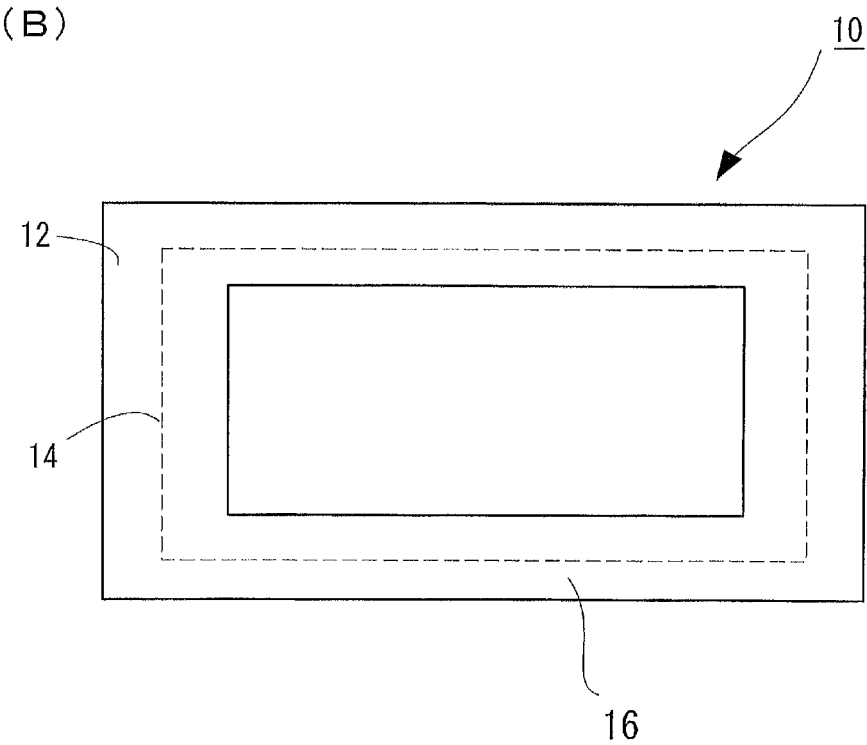

The "annular" shape is selected in accordance with the outer shape of the thin plate member 30, and thus when the thin plate member 30 is disk-shaped, the sealing material is, for example, circular ring-shaped; and when the thin plate member 30 is rectangular, the sealing material is, for example, rectangular ring-shaped, as shown in FIGS. 3 (A) and (B). Thus, the shape of the sealing material is not particularly limited.

For the convenience of description, the configuration of components of the thin plate member 30 formed from a cell, such as a positive electrode, a positive electrode cell, a negative electrode, a negative electrode cell and a separating membrane through which ions can permeate, are omitted from the drawings.

As shown in FIG. 1, the sealing material for a thin plate member 10 comprises a lateral sealing body 12 having a cross-sectional shape that is substantially rectangular. In the thickness direction of inner circumferential ends of the lateral sealing body 12, both ends 14 are positioned, from which a pair of lip-shaped sealing legs 16 branches in a fork shape and extends such that one leg is disposed on the front surface of the thin plate member 30 and the other leg is disposed on the back surface of the thin plate member 30.

The branching position of the sealing legs 16 may be appropriately modified according to the thickness of the thin plate member 30.

In this embodiment, as shown in FIG. 1, the sealing legs 16 are shaped to make a predetermined angle α. This shape is designed in order to allow the sealing legs 16 to be taken out easily from a mold, since the sealing legs 16 cannot be taken out easily when the size of the sealing material for a thin plate member 10 is small. Thus, the angle α is not particularly limited, and may be changed according to the dimension of the sealing material for a thin plate member 10.

Figure 4:
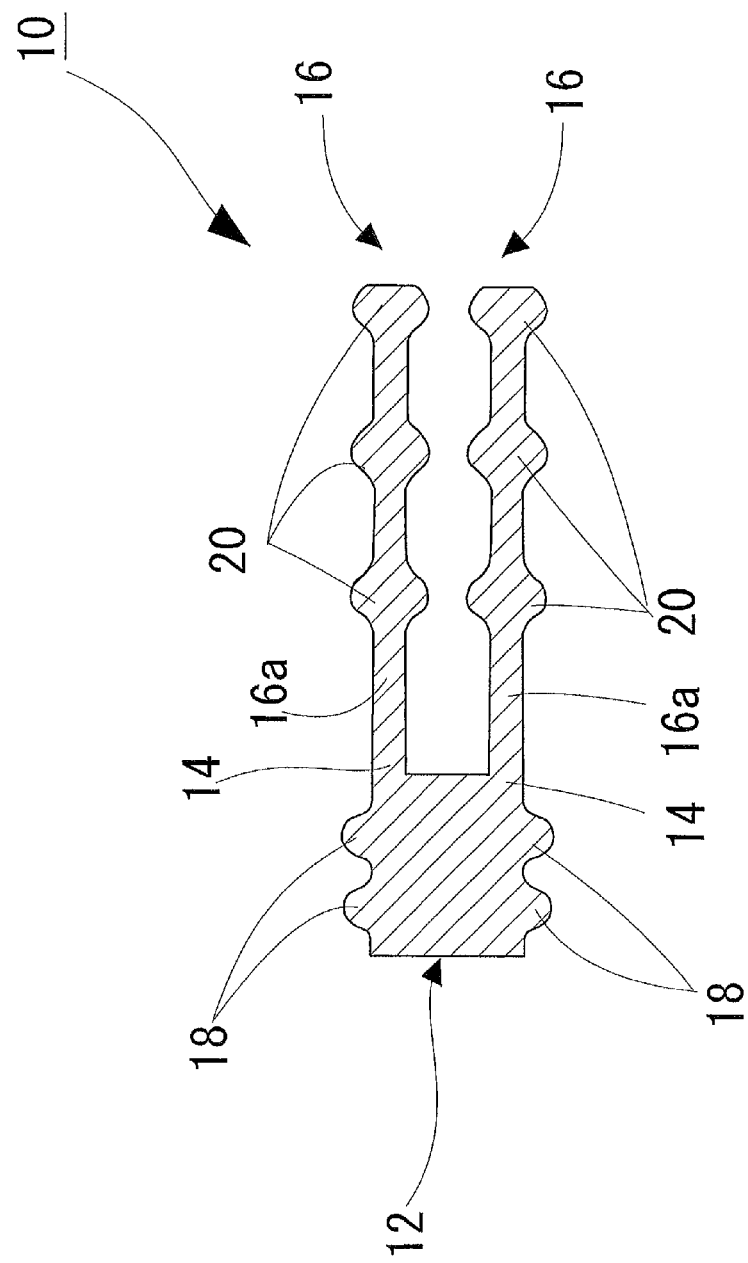
FIG. 4 is a cross-sectional view of a sealing material for a thin plate member according to another embodiment of the present invention.

Thus, when the dimension of the sealing material for a thin plate member 10 is large to some degree, the sealing legs 16 may branch in a fork shape substantially in parallel, as shown in FIG. 4.

L1, the width in the diameter direction of the lateral sealing body 12; L2, the branching length of the sealing leg 16; L3, the thickness of a body 16a of the sealing leg 16; and L4, the thickness of the lateral sealing body 12, as shown in FIG. 1, may be changed according to the type and the dimension of the thin plate member 30, and are not particularly limited. In view of sealing property, for example, the following dimension is desirable.

L1

L1 preferably has a thickness to fulfill:
L1≥L3×2+thickness of the thin plate member 30
L1 is desirably 0.5 to 2 times as long as L4.

L2

L2 is preferably 1.5 mm to 5.0 mm. The upper and lower sealing legs 16 desirably total 5 mm.

L3

L3 is preferably 0.2 mm to 1.0 mm, more preferably 0.25 mm to 1.0 mm. However, L3 is selected according to the thickness of the thin plate member 30, and is preferably thinner.

L4

It is desirable to fulfill: L4=the thickness of the thin plate member 30+L3×2.

Although not shown in the drawings, the sealing leg 16 may have one leg-side press-contact sealing portion 20, with L2 being one-third as long, or the sealing leg 16 may have two leg-side press-contact sealing portions 20, with L2 being two-thirds as long.

The lateral sealing body 12 has, on the front surface and the back surface thereof, a body-side press-contact sealing projection 18 which projects outward in the thickness direction thereof. Specifically, in this embodiment, the body-side press-contact sealing projection 18 is formed from a plurality of body-side press-contact sealing projections 18 having cross-sectional semicircle shape each spaced from one another with a predetermined interval in the diameter direction.

In this embodiment, the front surface and the back surface each have two body-side press-contact sealing projections 18 formed thereon: namely a total of four body-side press-contact sealing projections 18 are formed on the front and back surfaces.

In this case, the number, the spacing position and the projection dimension of the body-side press-contact sealing projection 18 are not particularly limited, and may be changed according to sealing property, type and dimension of the thin plate member 30 and the like.

On the other hand, on the sealing leg 16, a leg-side press-contact sealing portion 20 having a thickness larger than the thickness of the body 16a is formed. In this embodiment, a plurality of leg-side press-contact sealing portions 20 having a cross-sectional semicircle shape are formed. Specifically, in this embodiment, the leg-side press-contact sealing portion 20 is formed from a plurality of leg-side press-contact sealing portions 20 each spaced from one another with a predetermined interval in the branching direction.

In this embodiment, the front surface and the back surface of the sealing leg 16 each have three leg-side press-contact sealing portions 20 formed thereon: namely a total of six leg-side press-contact sealing portions 20 on the front and back surfaces.

In this case, the number and the spacing position of the leg-side press-contact sealing portions 20 and the ratio in terms of thickness of the leg-side press-contact sealing portion 20 to the body 16a are not particularly limited, and may be changed according to sealing property, type and dimension of the thin plate member 30 and the like.

Materials for the sealing material for a thin plate member 10 of the present invention are not particularly limited, and as materials having some degree of elasticity and capable of imparting sealing property, for example, synthetic resins and rubbers may be used.

In this case, the sealing material for a thin plate member 10 of the present invention is desirably composed of a rubber, which is an elastic member. Examples of rubbers that may be used include natural rubbers, ethylene/propylene rubbers such as EPM and EPDM and synthetic rubbers such as fluorine rubbers.

Examples of the synthetic resins that may be used include fluorine resins, polyimide resins, polyamideimide resins, polyetherimide resins, polyamideimide resins, polyphenylene sulfide resins, polybenzimidazole resins and polyetherketones resins.

The sealing material for a thin plate member of the present invention 10 thus constituted is attached to the lateral 32 of the thin plate member 30, and on the front and back surfaces of the thin plate member 30, one pair of the lip-shaped sealing legs 16 is disposed. Then, as shown in FIG. 2, the sealing material for a thin plate member 10 of the present invention is held by a pair of frames 24, to form a frame-held cell. A plurality of frame-held cells are stacked as needed, whereby a redox flow battery is assembled, though this is not shown in the drawings.

According to the sealing material for a thin plate member 10 of the present invention thus constituted, as shown in FIG. 2, a pair of sealing legs 16 branching in a fork shape and disposed on the front surface and the back surface of the thin plate member 30 provides sealing between the front/back surfaces of the thin plate member 30 and a counterpart member, for example, between the thin plate members 30 when the thin plate members 30 are stacked.

In particular, as shown in circled parts of FIG. 2, by the leg-side press-contact sealing portions 20 having a larger thickness than the thickness of the sealing leg 16, sealing can be more ensured between the front/back surfaces of the thin plate member 30 and a counterpart member, for example, between the thin plate members 30 when the thin plate members 30 are stacked.

On the other hand, as shown in FIG. 2, the lateral sealing body 12 disposed on the lateral 32 of the thin plate member 30 provides sealing between the lateral sealing body 12 and a counterpart member, thereby sealing the lateral 32 of the thin plate member 30.

In particular, as shown in FIG. 2, a body-side press-contact sealing projection 18 of the lateral sealing body 12 more ensures the lateral 32 of the thin plate member 30. Thus, a single sealing material for a thin plate member 10 ensures double sealing: sealing by a pair of sealing legs 16 and sealing by the lateral sealing body 12.

This embodiment makes it possible to provide a sealing material for a thin plate member with superior sealing property which is thinner and provides satisfactory sealing between the thin plate members 30 with fewer sealing materials and which can compactify and reduce in weight a device to be used and facilitate assembling with reduced cost.

As in this embodiment, when the sealing material for a thin plate member 10 is applied to, for example, thin plate members such as cells of secondary batteries including redox flow batteries, fuel cells and lead storage batteries, a pair of sealing legs 16 can prevent an electrolytic solution of the cells from leaking between the upper and lower cells, and the lateral sealing body 12 can prevent an electrolytic solution of the cells from leaking outward from the lateral.

Moreover, it is possible to provide a sealing material for a thin plate member which eliminates the need to form seal grooves as in prior art and which provides satisfactory sealing and can compactify and reduce in weight a device to be used and facilitate assembling with reduced cost as well as allowing more cells to be stacked resulting in improving fuel capacity.

By the lateral sealing body 12 disposed on the lateral 32 of the thin plate member 30, and the pair of sealing legs 16 branching in a fork shape and disposed on the front and back surfaces of the thin plate member 30, the sealing material for a thin plate member 10 can be easily attached to the lateral 32 of the thin plate member 30. The thin plate member having the sealing material for a thin plate member 10 attached thereto can be handled as a member, which leads to excellent handling property, e.g., at the time of assembling.

Figure 5:
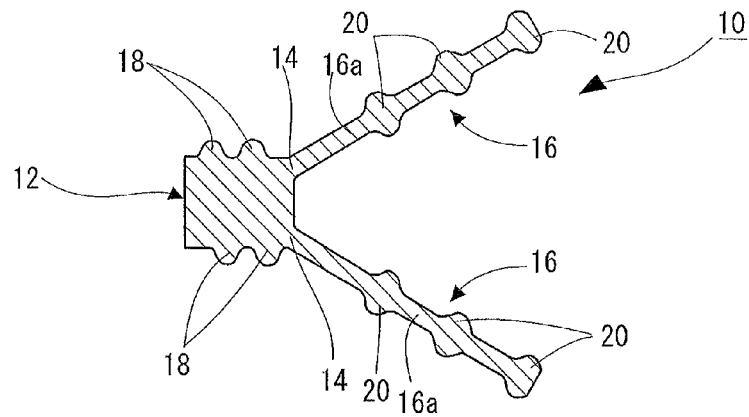
FIG. 5 is a cross-sectional view of a sealing material for a thin plate member according to another embodiment of the present invention.
Figure 5:
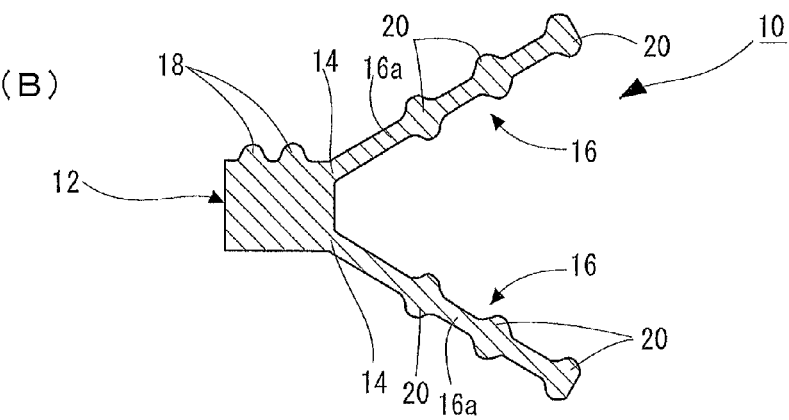
Figure 5:
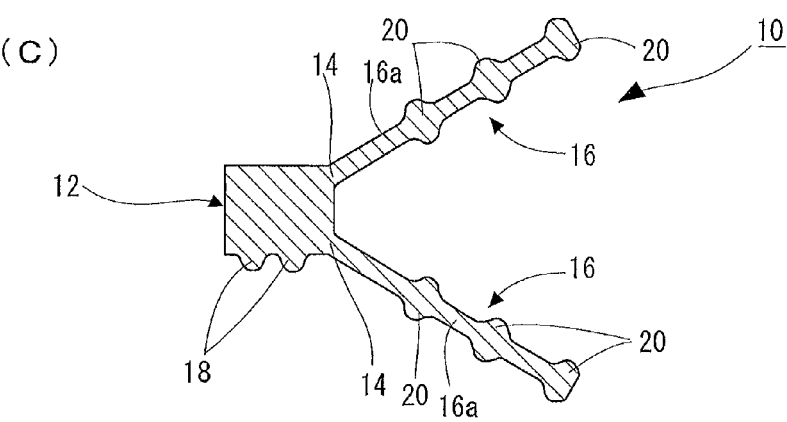

In this embodiment, the body-side press-contact sealing projections 18 are positioned in a corresponding manner between the front surface and the back surface. However, as shown in FIG. 5(A), the body-side press-contact sealing projections 18 may not be positioned in a corresponding manner between the front surface and the back surface. Furthermore, in this embodiment, the body-side press-contact sealing projections 18 are formed on the front and back surfaces. However, as shown in FIGS. 5(B) and (C), the body-side press-contact sealing projections 18 may be formed only on one side, namely either on the front surface side or on the back surface side.

Figure 6A:
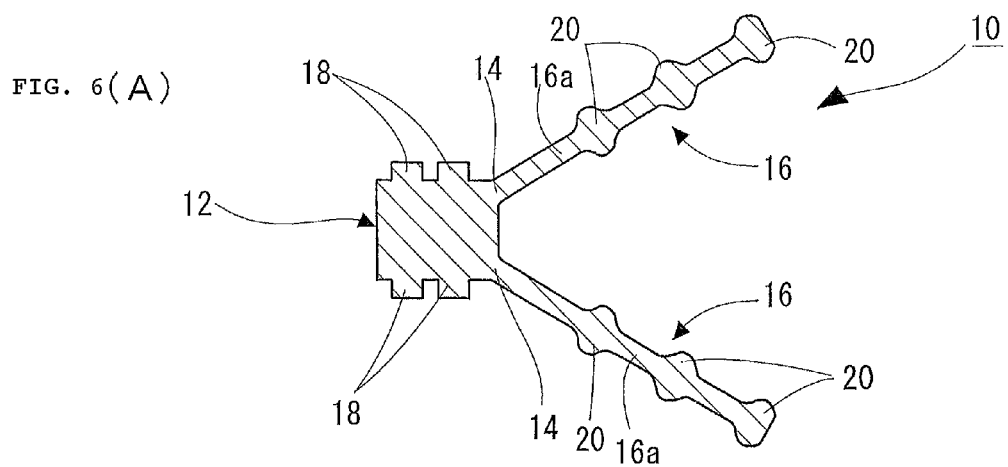
FIG. 6 is a cross-sectional view of a sealing material for a thin plate member according to another embodiment of the present invention.

In this embodiment, the body-side press-contact sealing projection 18 has a cross-sectional semicircle shape, but the shape is not particularly limited. For example, as shown in FIG. 6(A), the body-side press-contact sealing projection 18 may have a cross-sectional rectangular shape. The shape may be modified as needed.

Figure 6B:
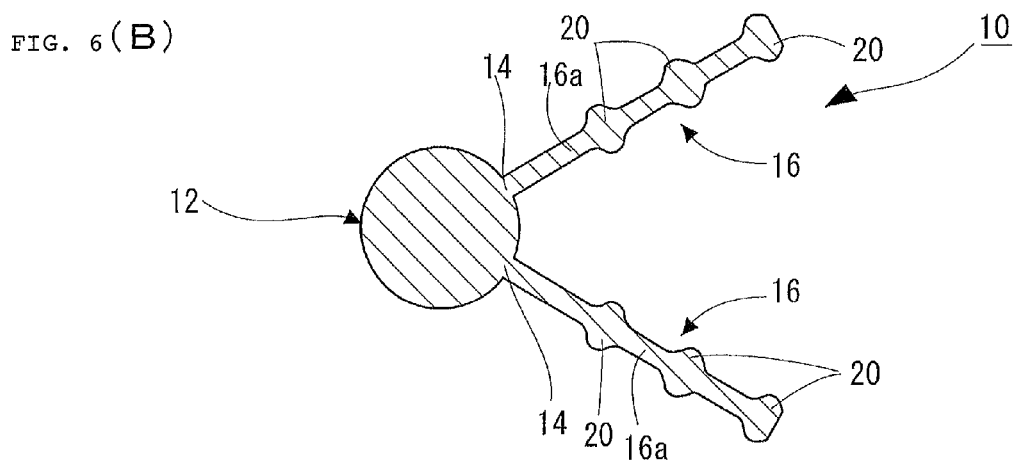

In this embodiment, the lateral sealing body 12 has a cross-sectional rectangular shape and the body-side press-contact sealing projection 18 has a cross-sectional rectangular shape. However, as shown in FIG. 6(B), the lateral sealing body 12 may have a cross-sectional circular shape which has sealing property.

Figure 7A:
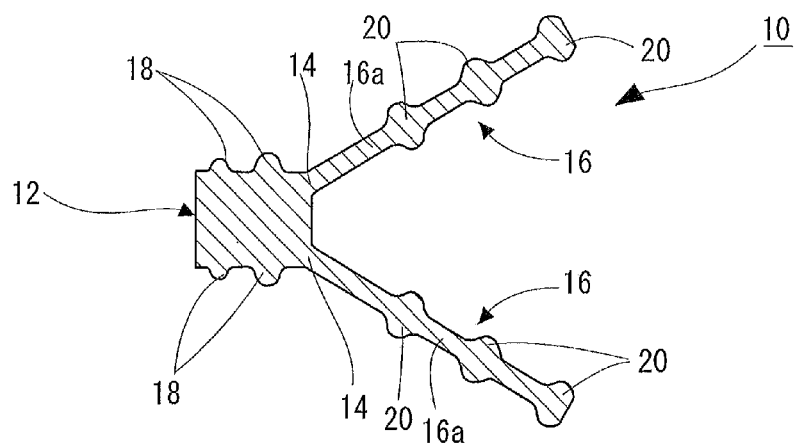
FIG. 7 is a cross-sectional view of a sealing material for a thin plate member according to another embodiment of the present invention.

In this embodiment, all of the body-side press-contact sealing projections 18 have the same dimension (thickness). However, as shown in FIG. 7(A), the size of the body-side press-contact sealing projection 18 may be gradually decreased from the inner diameter side to the outer diameter of the lateral sealing body 12 to thereby allow the body-side press-contact sealing projection 18 on the outer diameter side to function as an auxiliary seal for increasing sealing property.

Figure 7B:
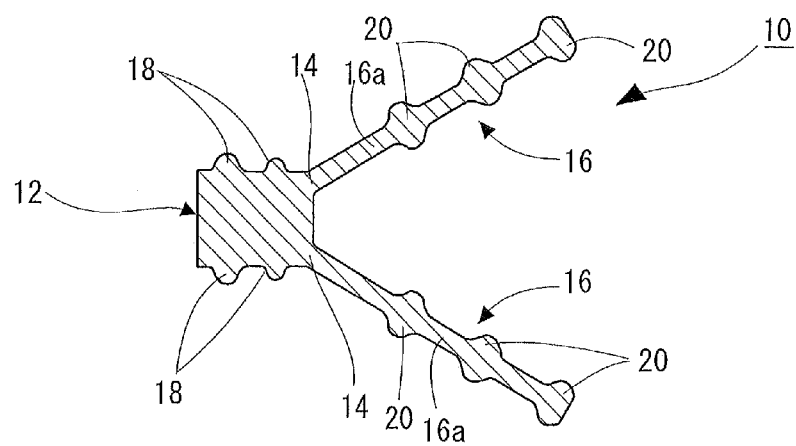

In contrast therewith, as shown in FIG. 7(B), the size of the body-side press-contact sealing projection 18 may be gradually increased from the inner diameter side to the outer diameter of the lateral sealing body 12 in order to increase sealing property.

Figure 8A:
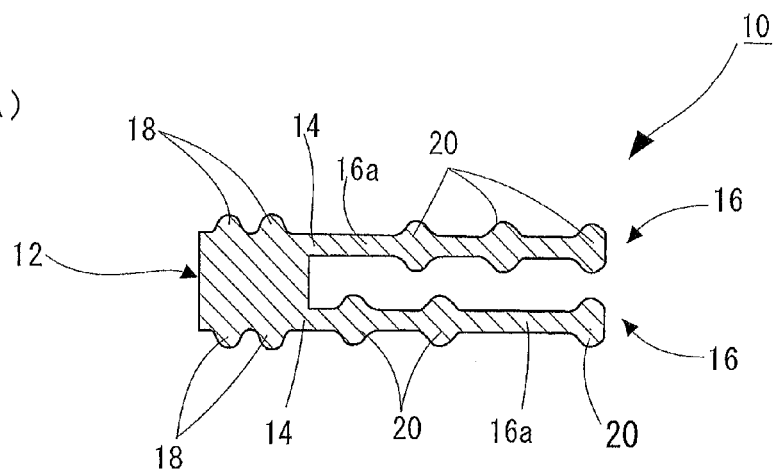
FIG. 8 is a cross-sectional view of a sealing material for a thin plate member according to another embodiment of the present invention.

In this embodiment, the leg-side press-contact sealing portions 20 are positioned in a corresponding manner between the sealing leg 16 on the front surface and the sealing leg 16 on the back surface. However, as shown in FIG. 8(A), the leg-side press-contact sealing portions 20 may not be positioned in a corresponding manner between the sealing leg 16 on the front surface and the sealing leg 16 on the back surface.

Figure 8B:
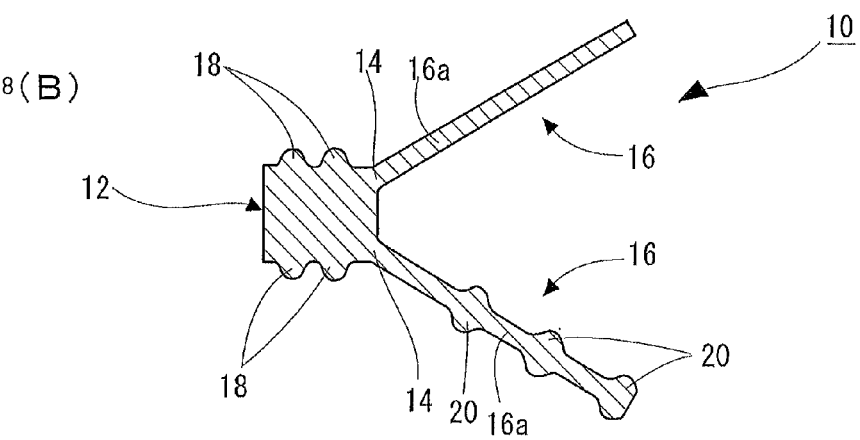
Figure 8C:
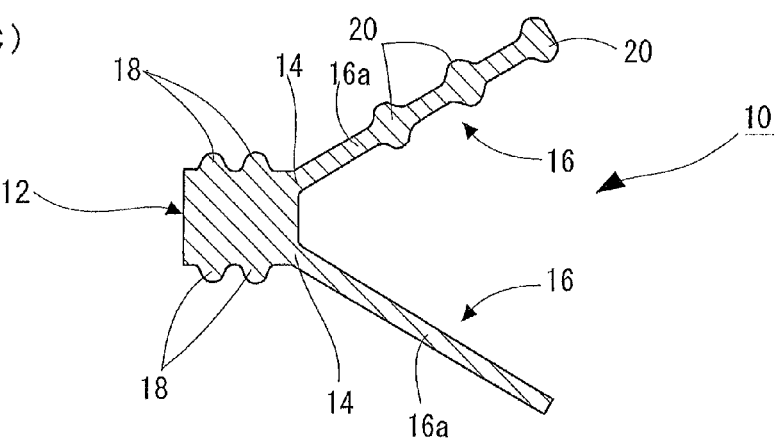

In this embodiment, the leg-side press-contact sealing portions 20 are provided on the sealing legs 16 on the front surface and on the back surface. However, as shown in FIG. 8(B) and FIG. 8(C), the leg-side press-contact sealing portions 20 may be provided only on one sealing leg 16.

Figure 9:
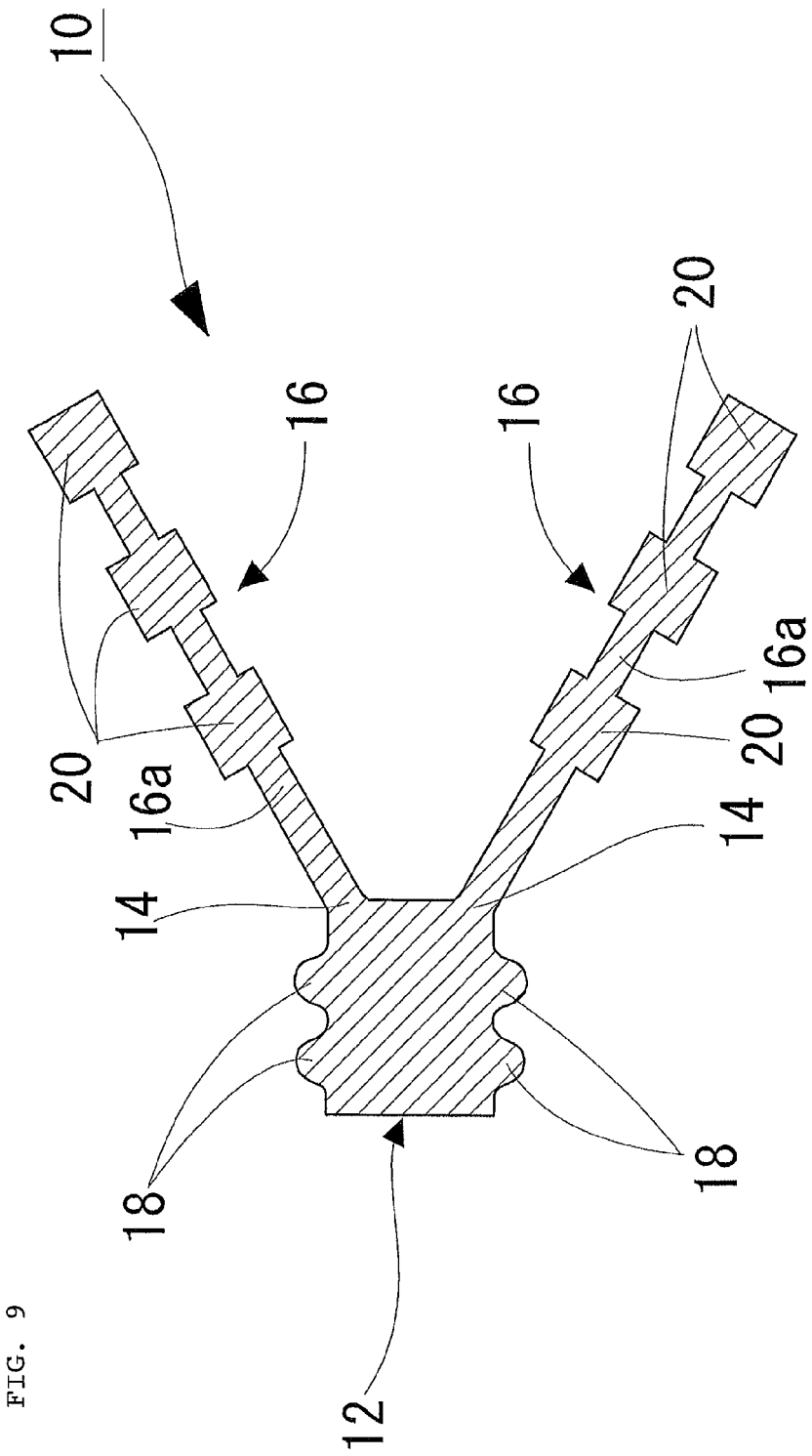
FIG. 9 is a cross-sectional view of a sealing material for a thin plate member according to another embodiment of the present invention.

In this embodiment, the leg-side press-contact sealing portion 20 has a cross-sectional semicircle shape, but the shape is not particularly limited, as long as the thickness of the leg-side press-contact sealing portion 20 is larger than the thickness of the body 16a of the sealing leg 16. For example, as shown in FIG. 9, the leg-side press-contact sealing portion 20 may have a cross-sectional rectangular shape, and this shape may be modified as needed.

Figure 10:
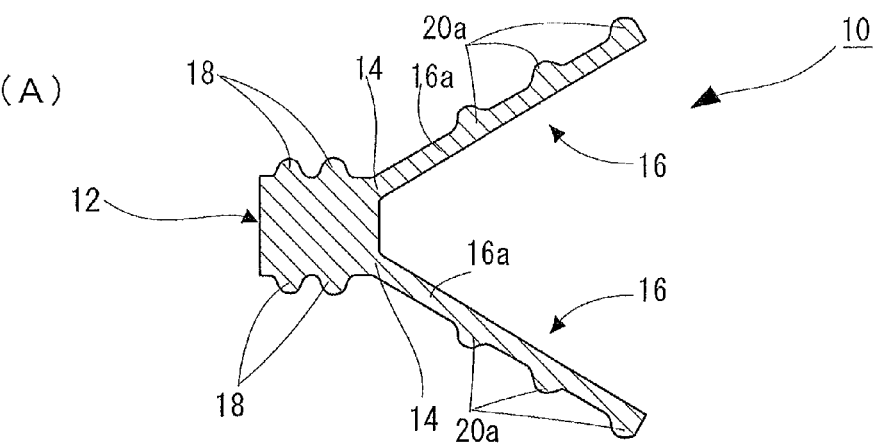
FIG. 10 is a cross-sectional view of a sealing material for a thin plate member according to another embodiment of the present invention.
Figure 10:
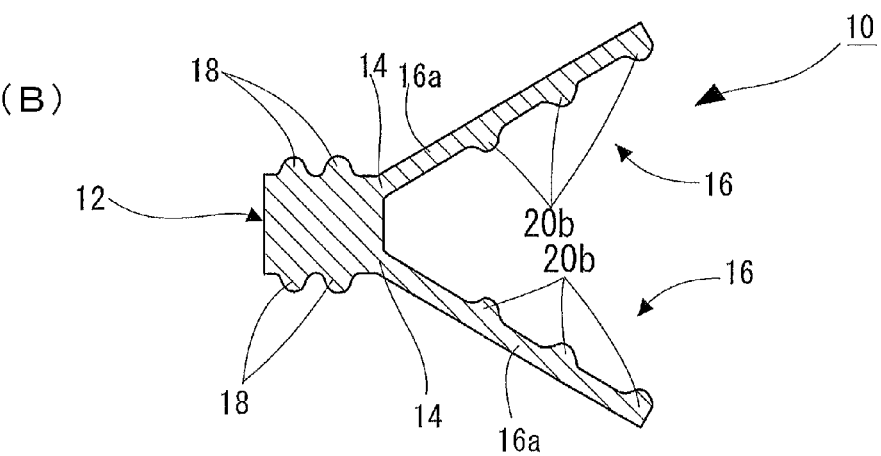
Figure 10:
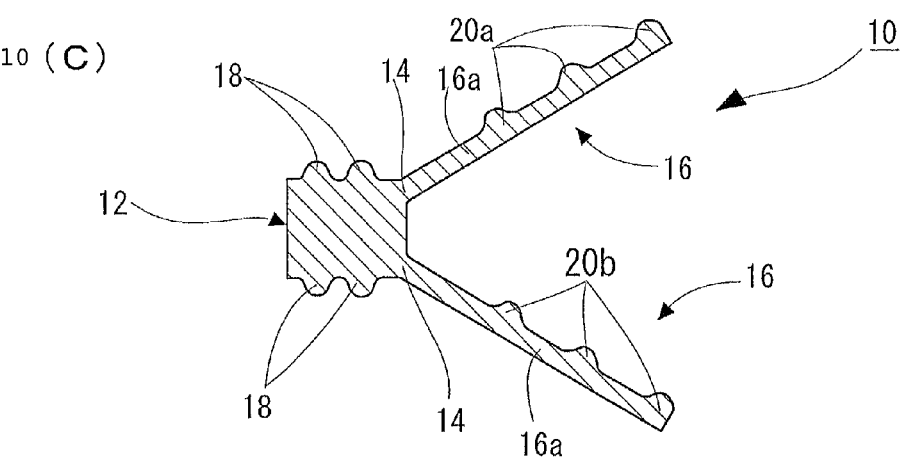

In this embodiment, as shown in FIG. 1, the leg-side press-contact sealing portion 20 is formed from outer projections 20a and inner projections 20b projecting from the front surface and the back surface of the sealing leg 16. However, the leg-side press-contact sealing portion 20 may be formed only from outer projections 20a as shown in FIG. 10(A); or only from inner projections 20b as shown in FIG. 10(B); or from the combination of the outer projections 20a and the inner projections 20b as shown in FIG. 10(C).

Figure 11A:
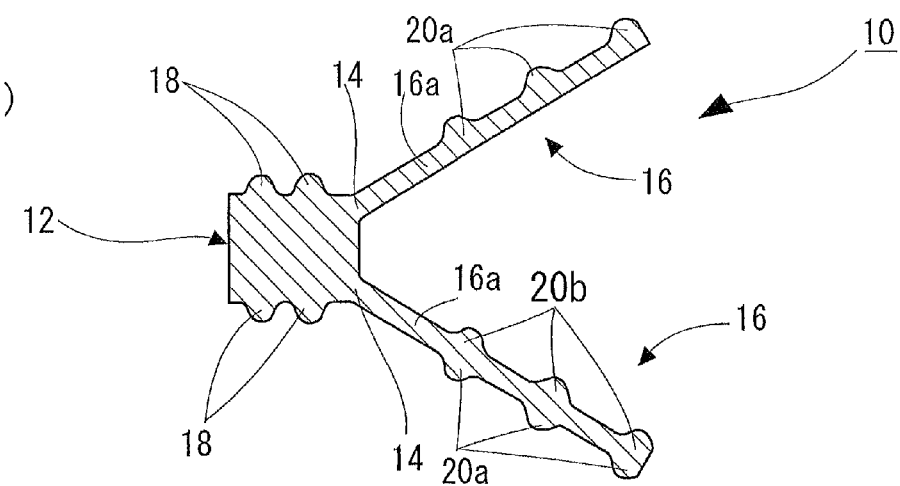
FIG. 11 is a cross-sectional view of a sealing material for a thin plate member according to another embodiment of the present invention.
Figure 11B:
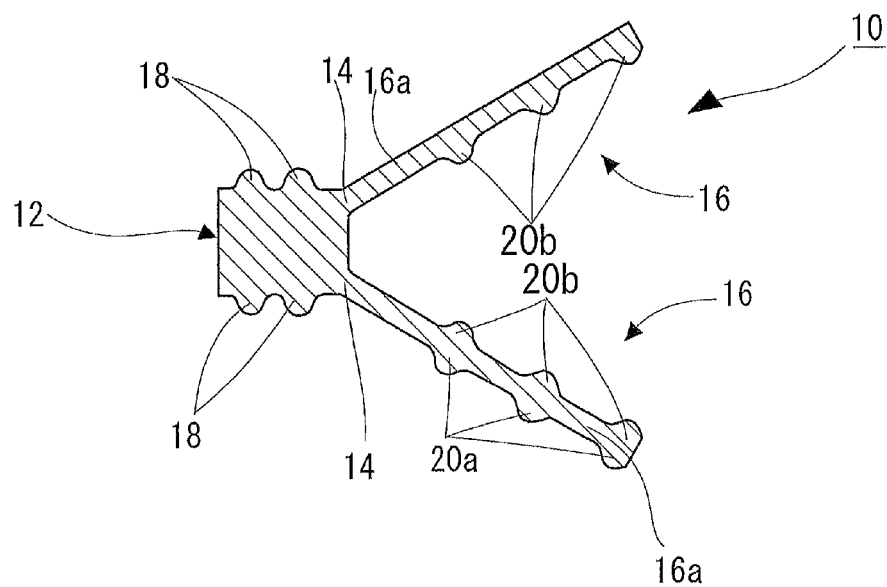

Furthermore, only one sealing leg 16 may be formed from the outer projections 20a alone as shown in FIG. 11(A); and only one sealing leg 16 may be formed from the inner projections 20b alone as shown in FIG. 11(B).

Figure 12A:
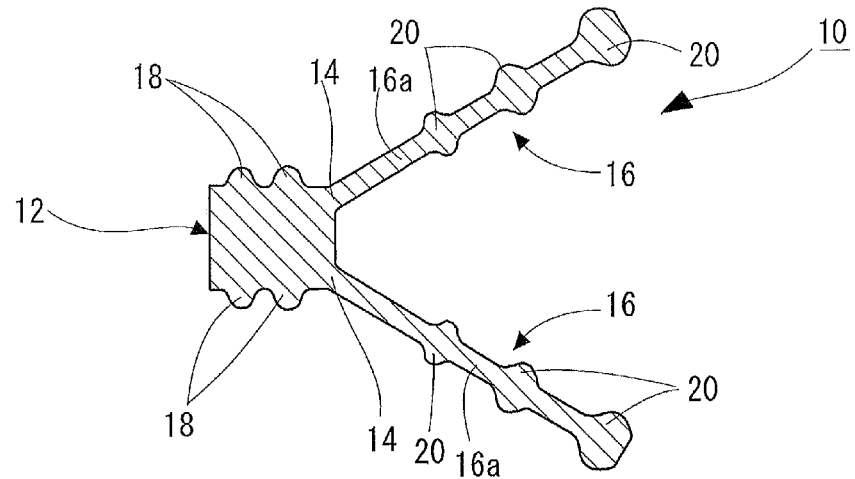
FIG. 12 is a cross-sectional view of a sealing material for a thin plate member according to another embodiment of the present invention.

In this embodiment, all of the leg-side press-contact sealing portions 20 have the same dimension (thickness). However, as shown in FIG. 12(A), the size of the leg-side press-contact sealing portion 20 may be gradually decreased from the tip to the base end in the branching direction of the sealing leg 16 to thereby allow a leg-side press-contact sealing portion 20 on the base end side to function as an auxiliary seal for increasing sealing property.

The leg-side press-contact sealing portion 20 may be, for example, such that the central sealing portion is smaller and the two sealing portions outside are larger, though this configuration is not shown in the drawings. In this way, how to combine the sealing portions is not limited.

Figure 12B:
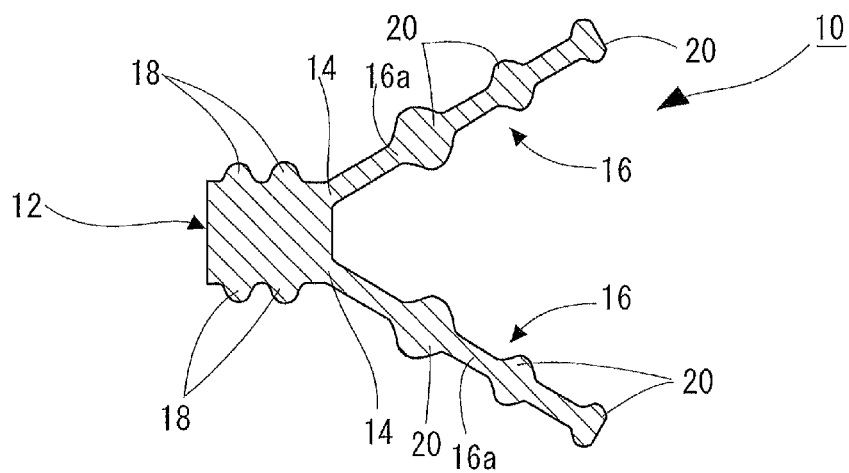

In contrast therewith, as shown in FIG. 12(B), the size of the leg-side press-contact sealing portion 20 may be gradually increased from the tip to the base end in the branching direction of the sealing leg 16 in order to increase sealing property.

Figure 13A:
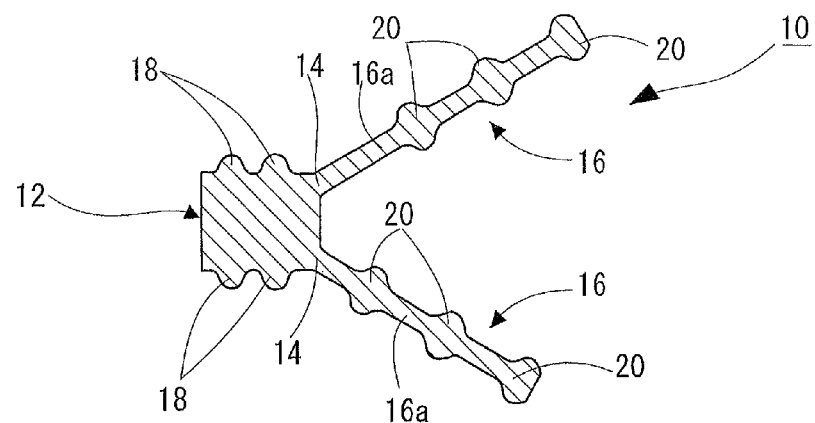
FIG. 13(A) is a cross-sectional view of a sealing material for a thin plate member according to another embodiment of the present invention.

In this embodiment, the branching length of the sealing legs 16 is the same between the sealing leg 16 on the front surface and the sealing leg 16 on the back surface. However, as shown in FIG. 13(A), the branching length of the sealing leg 16 may be different between the sealing leg 16 on the front surface and the sealing leg 16 on the back surface.

Figure 13B:
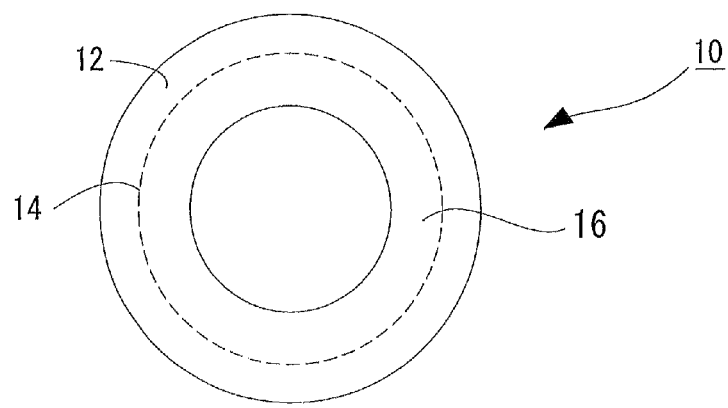
FIG. 13(B) is a top view of a sealing material for a thin plate member according to another embodiment of the present invention.
Figure 13C:
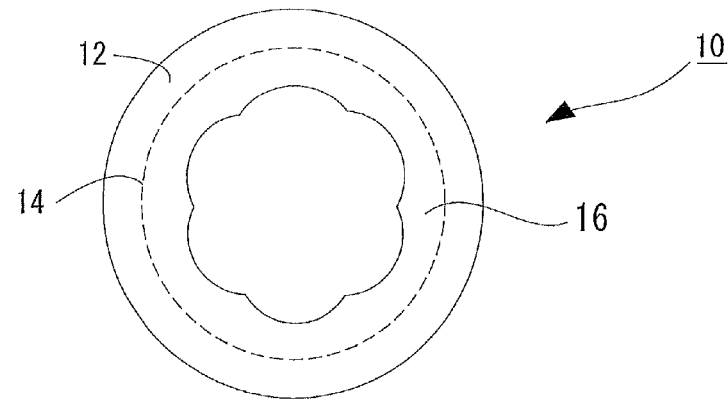
FIG. 13(C) is a top view of a sealing material for a thin plate member according to another embodiment of the present invention.

Furthermore, as shown in FIG. 13(B), the branching length of the sealing legs 16 may be the same over the annular shape of the sealing material for a thin plate member 10. As shown in FIG. 13(C), the branching length of the sealing legs 16 may be different over the annular shape of the sealing material for a thin plate member 10.

Figure 14:
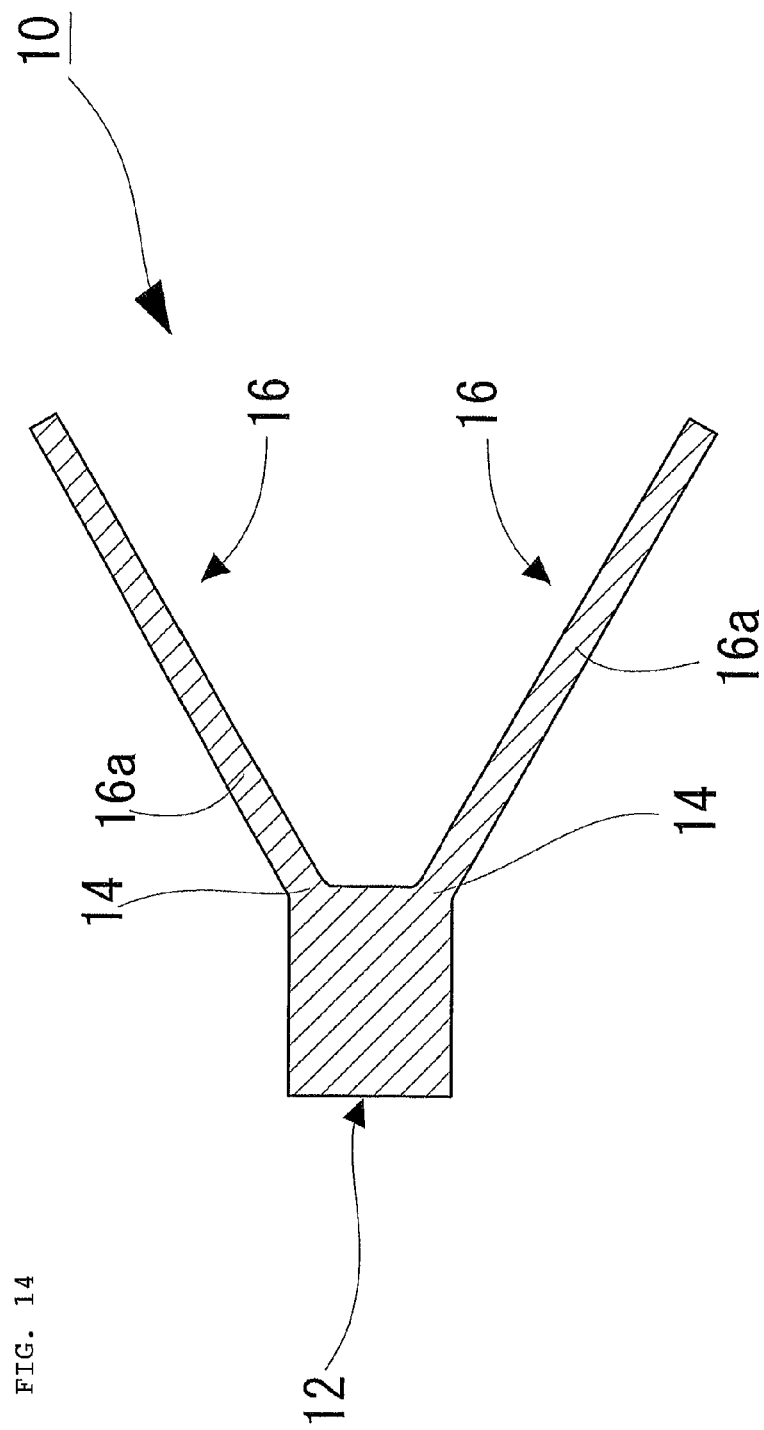
FIG. 14 is a cross-sectional view of a sealing material for a thin plate member according to another embodiment of the present invention.

FIG. 14 is a cross-sectional view of a sealing material for a thin plate member according to another embodiment of a device of the present invention.

This sealing material for a thin plate member 10 has basically the same configuration as that of the sealing material for a thin plate member 10 shown in FIG. 1. To the same component, the same reference number is attached, and a detailed description thereof is omitted.

In the sealing material for a thin plate member 10 of this embodiment, the leg-side press-contact sealing portion 20 having a larger thickness than that of the sealing leg 16 is omitted, and the body-side press-contact sealing projection 18 of the lateral sealing body 12 is omitted.

In this way, depending on use conditions, as in this embodiment, even when the leg-side press-contact sealing portion 20 having a larger thickness than that of the sealing leg 16 is omitted, and the body-side press-contact sealing projection 18 of the lateral sealing body 12 is omitted, it is possible to ensure double sealing: sealing by a pair of sealing legs 16 and sealing by the lateral sealing body 12.

Figure 15:
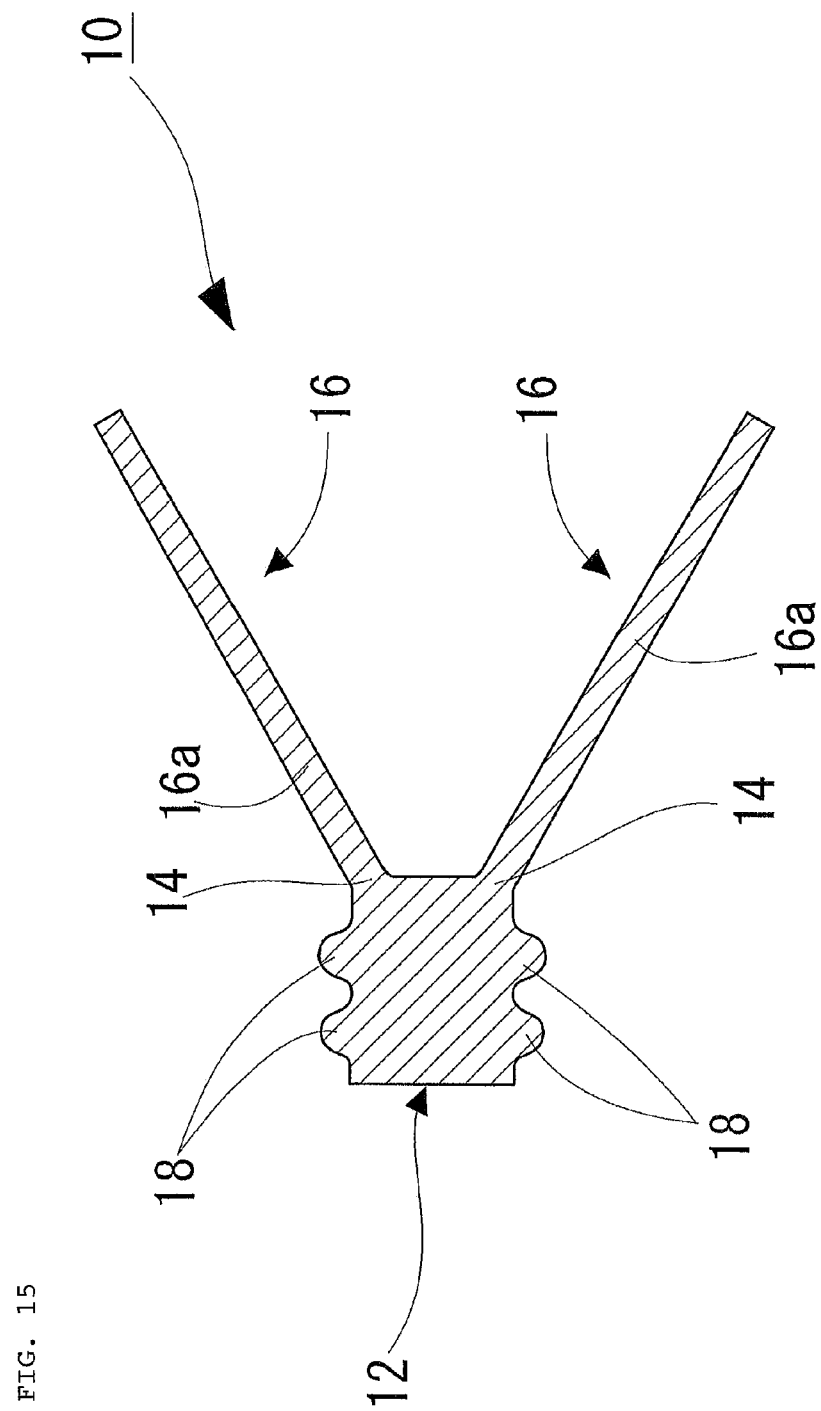
FIG. 15 is a cross-sectional view of a sealing material for a thin plate member according to another embodiment of the present invention.

FIG. 15 is a cross-sectional view of a sealing material for a thin plate member according to another embodiment of a device of the present invention.

This sealing material for a thin plate member 10 has basically the same configuration as that of the sealing material for a thin plate member 10 shown in FIG. 1. To the same component, the same reference number is attached, and a detailed description thereof is omitted.

In the sealing material for a thin plate member 10 of this embodiment, the leg-side press-contact sealing portion 20 having a larger thickness than that of the sealing leg 16 is omitted.

In this way, depending on use conditions, as in this embodiment, even when the leg-side press-contact sealing portion 20 having a larger thickness than that of the sealing leg 16 is omitted, it is possible to ensure double sealing: sealing by a pair of sealing legs 16 and sealing by the lateral sealing body 12.

Figure 16:
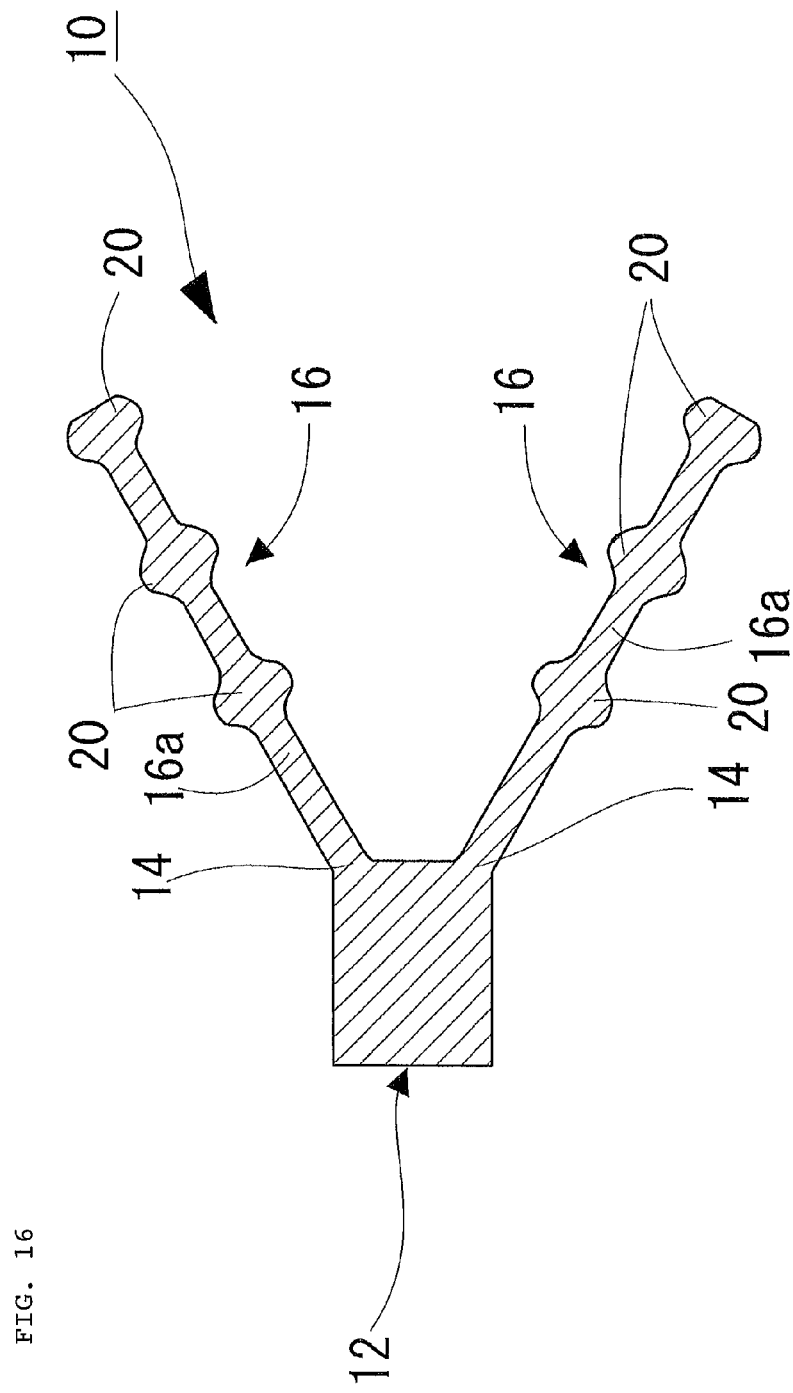
FIG. 16 is a cross-sectional view of a sealing material for a thin plate member according to another embodiment of the present invention.

FIG. 16 is a cross-sectional view of a sealing material for a thin plate member according to another embodiment of a device of the present invention.

This sealing material for a thin plate member 10 has basically the same configuration as that of the sealing material for a thin plate member 10 shown in FIG. 1. To the same component, the same reference number is attached, and a detailed description thereof is omitted.

In the sealing material for a thin plate member 10 of this embodiment, the body-side press-contact sealing projection 18 of the lateral sealing body 12 is omitted.

In this way, depending on use conditions, as in this embodiment, even when the body-side press-contact sealing projection 18 of the lateral sealing body 12 is omitted, it is possible to ensure double sealing: sealing by a pair of sealing legs 16 and sealing by the lateral sealing body 12.

Figure 17:
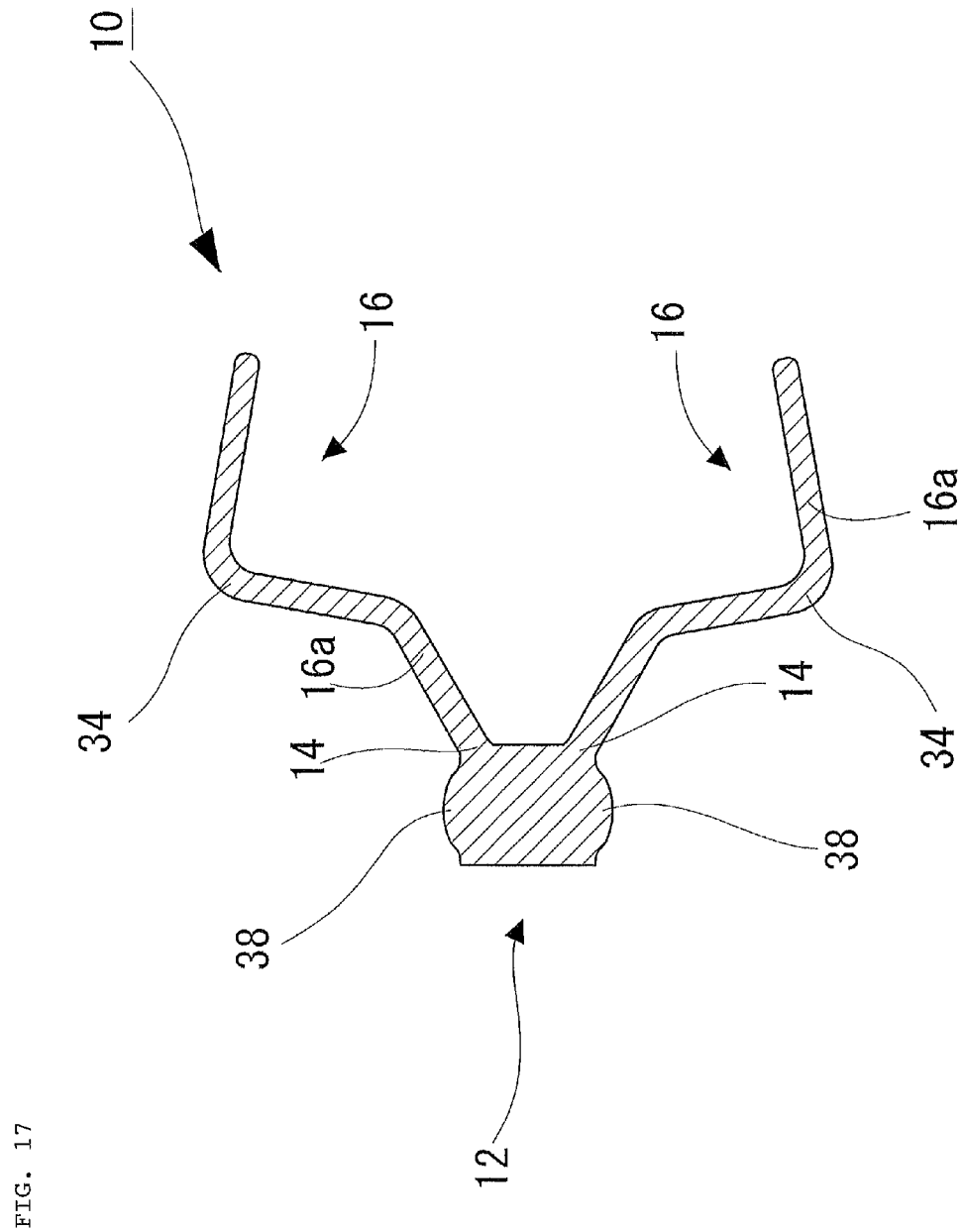
FIG. 17 is a cross-sectional view of a sealing material for a thin plate member according to another embodiment of the present invention.

FIG. 17 is a cross-sectional view of a sealing material for a thin plate member according to another embodiment of a device of the present invention.

This sealing material for a thin plate member 10 has basically the same configuration as that of the sealing material for a thin plate member 10 shown in FIG. 1. To the same component, the same reference number is attached, and a detailed description thereof is omitted.

In the sealing material for a thin plate member 10 of this embodiment, the leg-side press-contact sealing portion 20 having a larger thickness than that of the sealing leg 16 is omitted, and at the same time, the sealing leg 16 includes a dogleg-shaped bending portion 34. In addition, the body-side press-contact sealing projections 18 of the lateral sealing body 12 are provided, one provided on the upper side and the other provided on the other side.

In this way, depending on use conditions, the sealing leg 16 including the dogleg-shaped bending portion 34 as in this embodiment makes it possible to reduce compression load applied to the thin plate member 30 and prevent the friction with the thin plate member 30 from becoming larger than is needed, when the thin plate member 30 is held. By this configuration, when the thin plate member 30 is thermally swollen or thermally shrunk, the sealing leg 16 can behave so as to follow it.

By further providing the body-side press-contact sealing projections 18 of the lateral sealing body 12, one on the upper side and the other on the lower side, when the thin plate member 30 is held, high sealing property is ensured between the frame 24 and the lateral sealing body 12.

Figure 18:
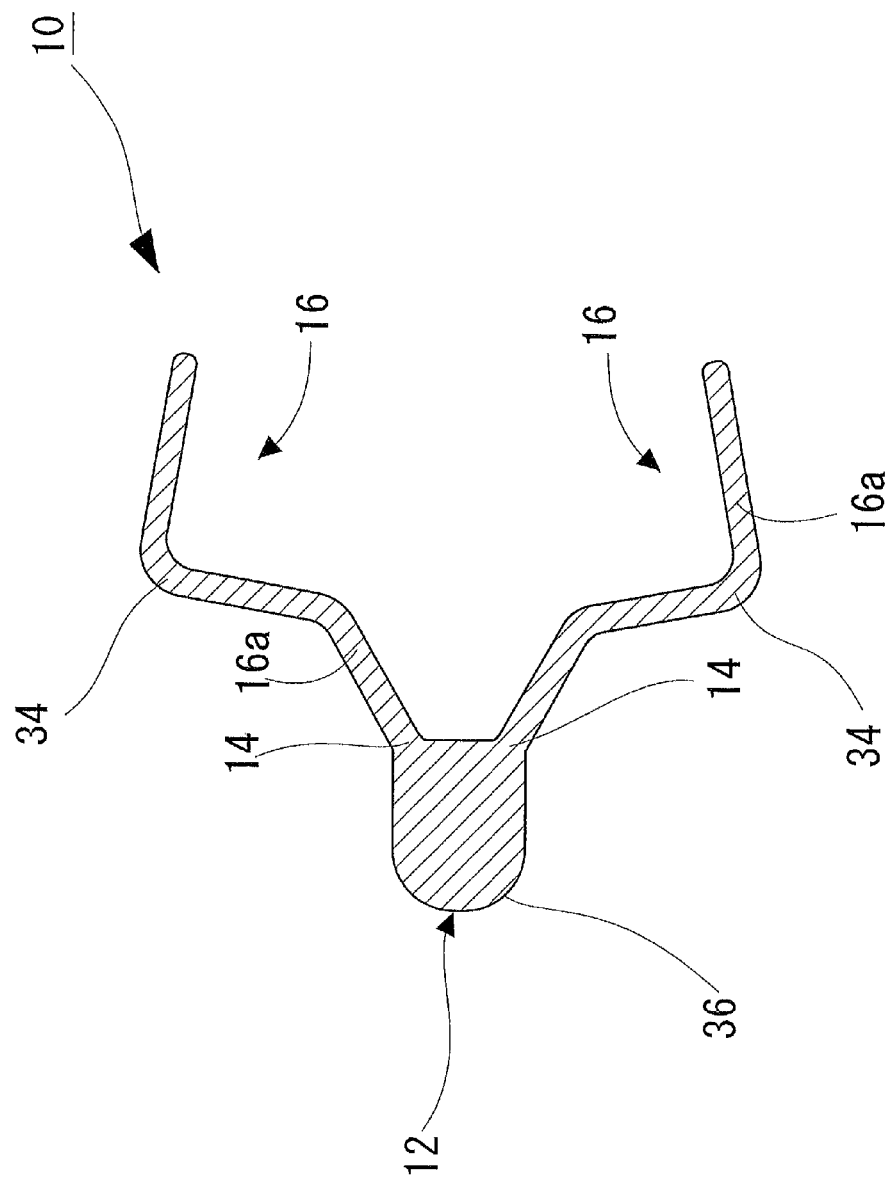
FIG. 18 is a cross-sectional view of a sealing material for a thin plate member according to another embodiment of the present invention.
Figure 19:
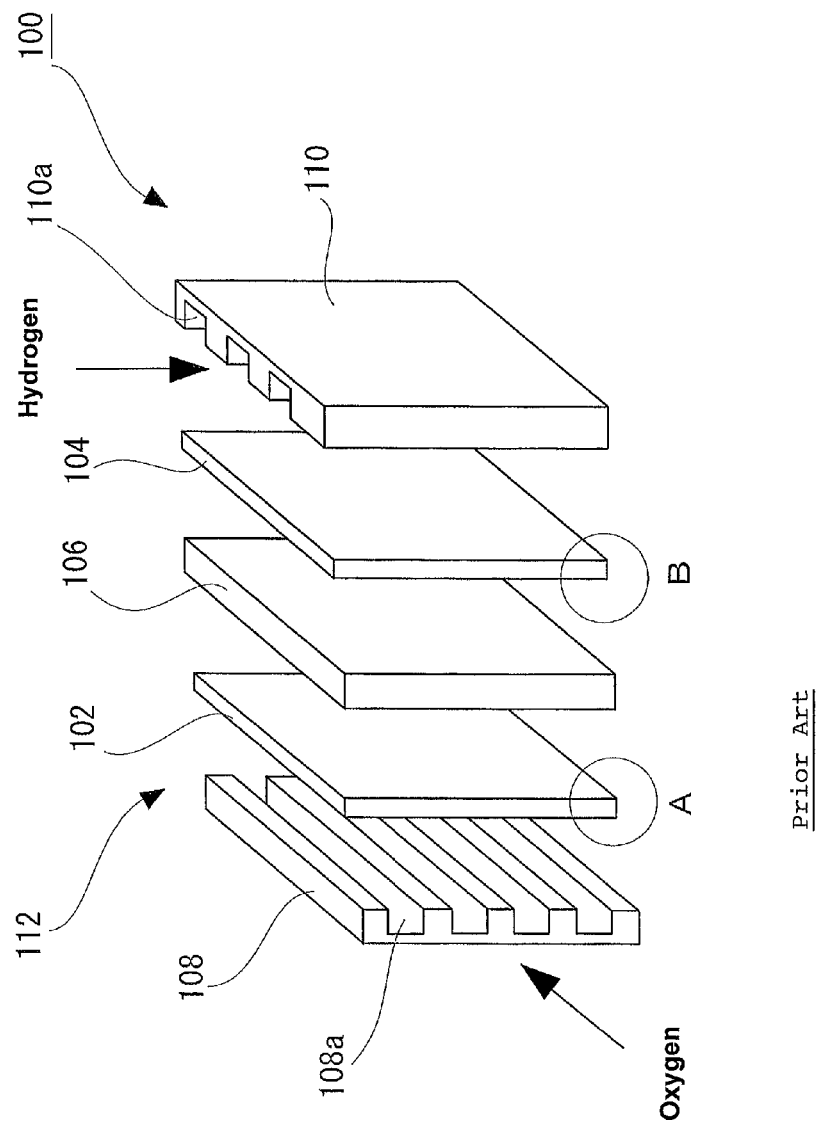
FIG. 19 is a partially-enlarged perspective view schematically showing a cell structure of a fuel cell of prior art.
Figure 20:
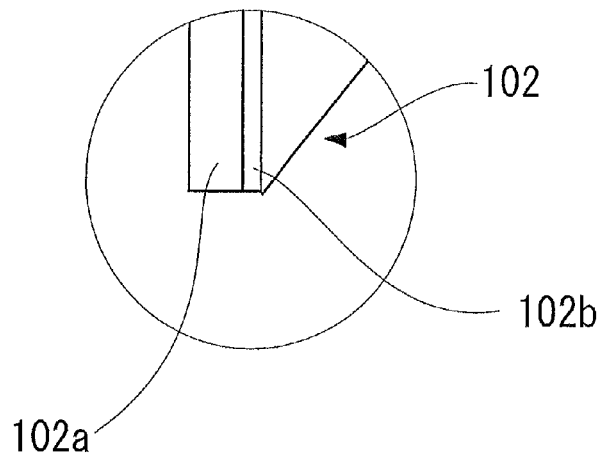
FIG. 20(A) is an enlarged view of "A" of FIG. 19.
FIG. 20(B) is an enlarged view of "B" of FIG. 19.
Figure 20:
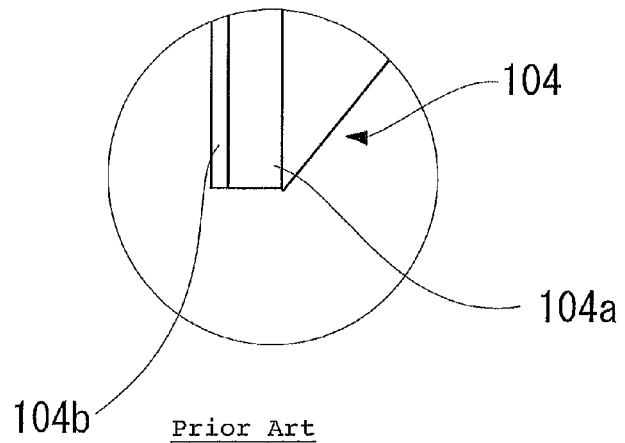
Figure 21:
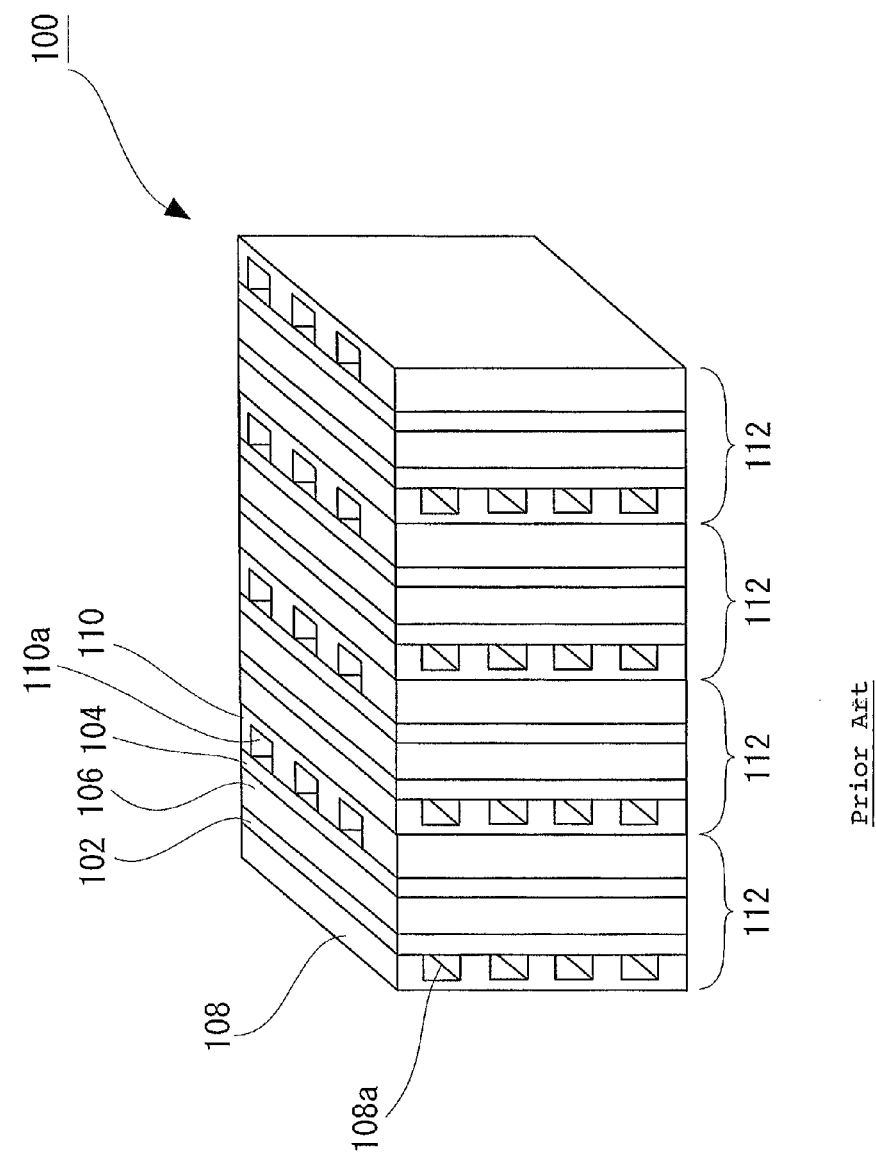
FIG. 21 is a partially-enlarged perspective view schematically showing a structure of a fuel cell of prior art.

FIG. 18 is a cross-sectional view of a sealing material for a thin plate member according to another embodiment of a device of the present invention.

This sealing material for a thin plate member 10 has basically the same configuration as that of the sealing material for a thin plate member 10 shown in FIG. 1. To the same component, the same reference number is attached, and a detailed description thereof is omitted.

In the sealing material for a thin plate member 10 of this embodiment, the leg-side press-contact sealing portion 20 having a larger thickness than that of the sealing leg 16 is omitted, and at the same time, the sealing leg 16 includes a dogleg-shaped bending portion 34. In addition, the body-side press-contact sealing projection 18 of the lateral sealing body 12 is omitted, and the lateral end thereof has a curving surface (curving portion 36).

In this way, depending on use conditions, the sealing leg 16 including the dogleg-shaped bending portion 34 as in this embodiment makes it possible to reduce compression load applied to the thin plate member 30 and prevent the friction with the thin plate member 30 from becoming larger than is needed, when the thin plate member 30 is held. By this configuration, when the thin plate member 30 is thermally swollen or thermally shrunk, the sealing leg 16 can behave so as to follow it.

By further allowing the lateral sealing body 12 to have a lateral end having curving surface (curving portion 36), it is possible to decrease sliding resistance when the sealing material holds the thin plate member 30 and is enclosed by the frame 24, and it is possible to ensure double sealing: sealing by a pair of sealing legs 16 and sealing by the lateral sealing body 12.

Hereinabove, preferable embodiments of the present invention are described, but the present invention is not limited thereto. For example, in the above embodiments, the sealing material for a thin plate member of the present invention 10 is annular, and is configured to be attached to the lateral on the outer circumferential side of the thin plate member 30. On the other hand, when the thin plate member 30 is ring-shaped, the sealing material for a thin plate member 10 may be attached to a lateral on the inner circumferential side of the thin plate member 30.

In the above embodiments, the sealing material for a thin plate member of the present invention 10 is applied to the thin plate member 30 which is a cell of a secondary battery such as a redox flow battery, but the application is not limited thereto. The sealing material for a thin plate member may be applied in order to provide sealing between thin plate members such as filters. As described above, various modifications can be made unless deviating from the object of the present invention.

INDUSTRIAL APPLICABILITY

The present invention is applicable to a sealing material for a thin plate member that provides sealing between thin plate members such as cells of secondary batteries including a redox flow battery, a fuel cell and a lead storage battery, and between thin plate members such as filters.

REFERENCE SIGNS LIST 10 sealing material for a thin plate member
12 lateral sealing body
14 both ends
16 sealing leg
16a body
18 body-side press-contact sealing projection
20 leg-side press-contact sealing portion
20a outer projection
20b inner projection
24 frame
30 thin plate member
32 lateral
34 bending portion
36 curving portion
100 fuel cell
102 positive electrode
104 positive electrode cell
106 negative electrode
108 negative electrode cell
110 separating membrane
112 cell
114 cell frame
118 inner seal groove
120 outer seal groove
122 sealing material

The invention claimed is:

1. An annular sealing material for a thin plate member that provides sealing between thin plate members, the sealing material comprising:
   a lateral sealing body disposed on a lateral of an outermost periphery side of the thin plate member, and
   a pair of sealing legs extending from the lateral sealing body in a fork shape and disposed on the front surface and the back surface of the thin plate member, a first leg of the pair of sealing legs extending upward from the lateral sealing body and a second leg of the pair of sealing legs extending downward from the lateral sealing body,
   wherein the pair of sealing legs extends in an inward diametrical direction of the annular sealing material such that a width of the pair of sealing legs is larger than a width of the lateral sealing body in the inward diametrical direction of the annular sealing material, and
   wherein the pair of sealing legs comprises a bending portion having a convex portion between the first and second legs of the pair of sealing legs that bends.

2. The sealing material for a thin plate member according to claim 1, wherein the lateral sealing body comprises a body-side press-contact sealing projection projecting outward in the thickness direction on at least one side of the front surface side and the back surface side.

3. The sealing material for a thin plate member according to claim 2, wherein the body-side press-contact sealing projection is formed from a plurality of body-side press-contact sealing projections each spaced with a predetermined interval in the diameter direction.

4. The sealing material for a thin plate member according to claim 2, wherein the body-side press-contact sealing projections are positioned in a corresponding manner between the front surface and the back surface.

5. The sealing material for a thin plate member according to claim 1, wherein at least one of the sealing legs comprises a leg-side press-contact sealing portion having a larger thickness compared to a thickness of the sealing legs.

6. The sealing material for a thin plate member according to claim 5, wherein the leg-side press-contact sealing portion is formed from a plurality of leg-side press-contact sealing portions each spaced with a predetermined interval in the branching direction.

7. The sealing material for a thin plate member according to claim 5, wherein the leg-side press-contact sealing portions are positioned in a corresponding manner between a pair of sealing legs.

8. The sealing material for a thin plate member according to claim 1, wherein the lateral sealing body comprises a curving portion at a lateral end thereof.

9. The sealing material for a thin plate member according to claim 1, wherein the thin plate member is a member used for batteries.

* * * * *

UNITED STATES PATENT AND TRADEMARK OFFICE
CERTIFICATE OF CORRECTION

PATENT NO.         : 9,077,010 B2                                    Page 1 of 1
APPLICATION NO.    : 13/982875
DATED              : July 7, 2015
INVENTOR(S)        : Akira Ueda et al.

It is certified that error appears in the above-identified patent and that said Letters Patent is hereby corrected as shown below:

In the Claims

Column 14, Line 14, Claim 1, delete "bends." and insert -- bend outward. --

Signed and Sealed this
Second Day of February, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,077,010 B2 | Page 1 of 1 |
| APPLICATION NO. | : 13/982875 | |
| DATED | : July 7, 2015 | |
| INVENTOR(S) | : Akira Ueda et al. | |

It is certified that error appears in the above-identified patent and that said Letters Patent is hereby corrected as shown below:

In the Claims

Column 14, Line 14, Claim 1, delete "bends." and insert -- bends outward. --

This certificate supersedes the Certificate of Correction issued February 2, 2016.

Signed and Sealed this
Seventh Day of June, 2016

Michelle K. Lee
*Director of the United States Patent and Trademark Office*